US009246173B2

(12) United States Patent
    Gerbec

(10) Patent No.: US 9,246,173 B2
(45) Date of Patent: Jan. 26, 2016

(54) PROCESS FOR SYNTHESIS OF HYBRID SILOXY DERIVED RESINS AND CROSSLINKED NETWORKS THEREFROM

(71) Applicant: Mitsubishi Chemical Corporation, Chiyoda-ku (JP)

(72) Inventor: Jeffrey A. Gerbec, Santa Barbara, CA (US)

(73) Assignee: Mitsubishi Chemical Corporation, Chiyoda-ku (JP)

( * ) Notice: Subject to any disclaimer, the term of this patent is extended or adjusted under 35 U.S.C. 154(b) by 0 days.

(21) Appl. No.: 14/083,165

(22) Filed: Nov. 18, 2013

(65) Prior Publication Data
    US 2014/0142242 A1    May 22, 2014

Related U.S. Application Data

(60) Provisional application No. 61/727,377, filed on Nov. 16, 2012.

(51) Int. Cl.
    *H01M 4/62*    (2006.01)
    *C08G 79/08*   (2006.01)
    *C08G 77/08*   (2006.01)
    *C08G 77/04*   (2006.01)

(52) U.S. Cl.
    CPC .............. *H01M 4/628* (2013.01); *C08G 77/04* (2013.01); *C08G 77/08* (2013.01); *C08G 79/08* (2013.01); *C08G 2150/90* (2013.01)

(58) Field of Classification Search
    None
    See application file for complete search history.

(56) References Cited

U.S. PATENT DOCUMENTS

| 7,148,370 B1 | 12/2006 | Rubinsztajn et al. | |
|---|---|---|---|
| 2006/0211836 A1 | 9/2006 | Rubinsztajn et al. | |
| 2009/0250218 A1* | 10/2009 | Akarsu et al. | 166/292 |
| 2013/0267653 A1* | 10/2013 | Egawa | 524/588 |

FOREIGN PATENT DOCUMENTS

| WO | WO 2009/111193 A1 | 9/2009 |
|---|---|---|
| WO | WO 2009/129175 A1 | 10/2009 |
| WO | WO 2012/077529 | * 6/2012 |
| WO | WO 2011/112699 | * 9/2012 |

OTHER PUBLICATIONS

"New Facile Process for Synthesis of Borosiloxane Resins" authored by Rubinsztajn and published in the Journal of Inorganic and Organometallic Polymers and Materials (2014) 24(6), 1092-1095.*
"Compositional Dependence of Apatite Formation in Sol-Gel Derived Organic-Inorganic Hybrids" authored by Whang et al., and published in Glass Physics and Chemistry (2005) 31(3), 396-401.*
Gerhard Erker, "Tris(pentafluorophenyl)borane: a special boron Lewis acid for special reactions" The Royal Society of Chemistry, Dalton Transactions, vol. 11, Mar. 11, 2005, pp. 1883-1890.
Daniel J. Parks, et al., "Tris(pentafluorophenyl)boron-Catalyzed Hydrosilation of Aromatic Aldehydes, Ketones, and Esters" Journal of the American Chemical Society, vol. 118, No. 39, 1996, pp. 9440-9441.
Slawomir Rubinsztajn, et al., "A New Polycondensation Process for the Preparation of Polysiloxane Copolymers" Macromolecules, vol. 38, No. 4, 2005, pp. 1061-1063.
David B. Thompson, et al., "Rapid Assembly of Complex 3D Siloxane Architectures" Journal of the American Chemical Society, vol. 130, No. 1, 2008, pp. 32-33.
Julian Chojnowski, et al., "Synthesis of Highly Branched Alkoxysiloxane-Dimethylsiloxane Copolymers by Nonhydrolytic Dehydrocarbon Polycondensation Catalyzed by Tris(pentafluorophenyl)borane" Macromolecules, vol. 41, No. 20, 2008, pp. 7352-7358.
Helmut Dislich, "New Routes to Multicomponent Oxide Glasses" Angewandte Chemie, International Edition, vol. 10, No. 6, Jun. 1971, pp. 363-370.
S.P. Mukherjee, "Sol-Gel Processes in Glass Science and Technology" Journal of Non-Crystalline Solids, vol. 42, 1980, pp. 477-488.
A.D. Irwin, et al., "Spectroscopic Investigations of Borosiloxane Bond Formation in the Sol-Gel Process" Journal of Non-Crystalline Solids, vol. 89, 1987, pp. 191-205.
Gian Domenico Soraru, et al., "Organically Modified SiO2-B2O3 Gels Displaying a High Content of Borosiloxane (=B—O—Si=) Bonds" Chemistry of Materials, vol. 11, No. 4, 1999, pp. 910-919.
Ahmet Kasgoz, et al., "Sol-gel preparation of borosilicates" Journal of Non-Crystalline Solids, vol. 243, 1999, pp. 168-174.
R.C. Mehrotra, "Present Status and Future Potential of the Sol-Gel Process" Structure and Bonding, vol. 77, 1992, pp. 1-36.

* cited by examiner

*Primary Examiner* — Marc Zimmer
(74) *Attorney, Agent, or Firm* — Oblon, McClelland, Maier & Neustadt, L.L.P.

(57) ABSTRACT

A hybrid siloxy derived resin and a method of making them and a method of applying them as a benign passivant on electrochemical electrodes is provided. These resins are made by the process of reacting a silane and an alkaline, transition metal or metalloid alkoxide, in the presence of a lewis acid. The methods described do not require further purification steps; heat; or strong acid/base catalysis to initiate hydrolysis.

22 Claims, 12 Drawing Sheets

PROCESS FOR SYNTHESIS OF HYBRID SILOXY DERIVED RESINS AND CROSSLINKED NETWORKS THEREFROM

CROSS REFERENCE TO RELATED APPLICATIONS

This application claims priority to U.S. provisional application 61/727,377 filed Nov. 16, 2012, which is incorporated herein by reference.

FIELD OF THE INVENTION

The invention relates to hybrid siloxy derived resin compositions as passive corrosion inhibiting films on electrodes and a method of making hybrid siloxy derived resin compositions. More particularly, it relates to condensation reaction between silanes ($R_3Si$—H) and an alkaline, transition metal or metalloid alkoxides in the presence of a Lewis acid and condensing said material on electrodes creating a passive film whereby unwanted side reaction rates are significantly depressed.

BACKGROUND OF THE INVENTION

It is well recognized that the Li-ion battery system has revolutionized our quality of life. We find the ubiquitous Li-ion battery in personal electronic devices, in hybrid electric vehicles, electric vehicles and the so-called hybrid power plants that leverage renewable energy sources to offset peak load. It is equally well known to those skilled in electrochemical energy storage systems that Li-ion batteries have limitations based on their inherent safety issues. Lithium itself has a relatively low melting point (180° C. at atmospheric pressure). More particularly, it is well understood that "post Li-ion" battery materials are essential to enabling long range electric vehicles and economic leveraging renewable energy generation such as lithium-sulfur, lithium-air, magnesium-sulfur and calcium-sulfur electrochemical cells.

As a commodity, lithium has reasonably low abundance compared to calcium and magnesium. Additionally, spent Li-ion batteries and packs have to be collected and processed to extract elements that pose risks to the environment such as elemental lithium, organic electrolyte, lithium salts, and various positive electrode elements such as nickel, manganese and cobalt. This creates an energy intensive cradle-to-grave process.

Now imagine an energy storage system that, when spent, is effortlessly processed back into the earth where the elemental form is so abundant that there is virtually no net negative environmental perturbation. Here we specifically focus on divalent metal-sulfur electrochemical cells (calcium and magnesium). Calcium in its native form (more specifically calcium carbonate and calcium oxide) is everywhere in appreciable amounts; in the water we drink, in concrete, in building materials that make up residential houses and commercial skyscrapers and as a primary constituent in the human body forming our skeletal system. Nonetheless, it's evident that calcium, in general, is more ubiquitous than lithium.

Futile efforts have ensued since the 1970's to investigate and control metallic calcium's activity in the form of an electrochemical cell. Researchers have essentially found that calcium is so reactive that it spontaneously generates an ionic insulating interface with nearly every trace element it in comes in contact with, rendering it useful only to a single discharge, primary battery with a shelf life of less than one day. Lithium and calcium based energy storage systems were competitively investigated in the late 1970's and throughout the 1980's until Goodenough and co-works achieved a breakthrough for the rechargeable Li-ion battery (U.S. Pat. Nos. 5,910,382, 6,514,640). This was the tipping point at which Li-ion battery material research dominated other energy storage platforms.

To establish the need of a functional coating on electrochemical energy storage electrodes, the following paragraphs will outline previous strategies and milestones relating to materials developments to achieve a lithium and calcium based secondary electrochemical energy storage system. The typical cell configuration consists of a counter electrode (CE), a metal salt dissolved in a nonaqueous, aprotic organic electrolyte usually in the concentration range 0.5M to 1.5M (EL), and a working electrode (WE).

Aurback and co-worker's concluded that metallic calcium is too reactive toward nonaqueous liquid electrolytes, forming a compact ionic insulating passivation layer (*J. Eletrochem. Soc.*, 138, 1991, 3536). This layer is thought to be composed of calcium oxide, calcium carbonate and various calcium alkyl compounds inhibiting the electrochemical deposition of $Ca^{2+}$. It was shown through their studies that the most promising electrolyte was 0.5M $Ca(ClO_4)_2$ in acetonitrile.

Amatucci and co-workers (*J. Eletrochem. Soc.*, 148, 2001, A940) focused on a reversible intercalation cathode, V2O5, for di and trivalent metal ions. It was shown that $Ca^{2+}$ can be electrochemically inserted and deinserted two-and-a-half times. However, metallic calcium CE was substituted with an activated carbon CE which can only accommodate an electrical double layer of $Ca^{2+}$ a few times before breaking down.

More recently, Hayashi et. al. demonstrated $Ca^{2+}$ insertion into crystalline $V_2O_5$ (WE) by using Ca metal (CE). Thus, the $Ca^{2+}$ was unable to be de-inserted (*Electrochem Solid St.*, 7, 2004, A119).

Even more recently, Kano et. al., proposed that calcium isopropoxide, as an EL additive to calcium di(bis(trifluoromethanesulfonylimide)) in propylene carbonate, is essential for calcium deposition (abstract #50, 218th *Electrochemical Society Meeting*, 2010). Although it is claimed in the text that more than one redox cycle can be achieved, it is not figuratively demonstrated. Several attempts were made to reproduce this result as a reference to the current invention, however all attempts failed. It was determined through cyclic voltammetry that calcium di(bis(trifluoromethanesulfonylimide)) decomposed against calcium metal forming a $CaF_2$ side product. Moreover, platinum metal was used as the WE and CE in Kano's example thus they failed to demonstrate the stability of calcium di(bis(trifluoromethanesulfonylimide)) against calcium metal. To date, there has been no advancement or effort to directly stabilize the calcium-electrolyte interface. One of the inventive concepts herein takes use of a well-known Li-ion battery electrolyte additive, tris (pentafluorophenyl)borane, as a nonaqueous catalyst to synthesize a general class of well-defined binary hybrid siloxy derived resins. Another inventive concept herein applies hybrid siloxy derived resins as passivants on electrodes used in electrochemical energy storage cells.

The following paragraphs will describe the state-of-the-art of borosiloxane resin synthesis, complex polysiloxanes achieved by catalyzed hydrosilylation and their limitations.

Polysiloxanes are one of the most technologically important class of materials. They constitute one of the more broader platforms of root materials as a result of their ease of functionalization, attainable properties and topology and organic side group functionalization. Polysiloxanes are therefore the basis for diversifying a well-known, earth abundant platform to chemically and mechanically control the activity of highly reactive electrochemical interfaces to enable the forward progress in high energy density electrochemical energy systems.

The synthesis, thermal and mechanical properties and technological applications of polysiloxanes are well documented [1]. Much effort has focused on Lewis acid catalyzed condensation using tris(pentafluorophenyl)borane, $B(C_6F_5)_3$. $B(C_6F_5)_3$ has been found to be a robust, stable and water tolerant Lewis acid catalyst enabling many key organic transformations and polymerizations [2a,b]. Parks and co-workers first demonstrated the mild, selective hydrosilation of C=O functions by $B(C_6F_5)_3$ [3]. Their work showed that aromatic aldehydes, ketones and esters could undergo astonishingly mild reductions at room temperature.

Many examples of reductive transformations utilizing $B(C_6F_5)_3$ have followed. In particular, Rubinsztajn et al. demonstrated the catalytic synthesis of polysiloxane copolymers by the condensation reaction between hydrosilanes and alkoxysilanes [4]. This was the first example of an efficient and clean heterocondensation reaction between disilanes and dialkoxysilanes whereby the majority of the byproduct is autogenously removed as a low boiling alkane (i.e. methane, ethane, propane).

Most recently, the simplicity of accessing highly branched siloxanes and polysiloxane copolymers were reported. Thompson and Brook [5] described the assembly of complex 3-D siloxane architectures near ambient conditions producing symmetrically branched siloxane structures in very high yield. At the same time, Chojnowski et al [6], demonstrated polycondensation of tetraalkoxysilanes with 1,1,3,3-tetramethyldisiloxane catalyzed by $B(C_6F_5)_3$ yielding highly branched organopolysiloxanes while Rubinsztajn et al. has shown synthesis of siloxane networks by the $B(C_6F_5)_3$ catalyzed disproportionation of hydridosiloxanes [7a-b].

Siloxanes are thermally stable, generally inert but in the case of demanding applications, such as the electrolytic stress in an energy storage device, there is need for improvement and diversification. Siloxanes are neither stable in basic environments, nor when exposed to high temperatures—they are prone to thermal oxidation and rearrangement of the polymer backbone resulting in loss of desired properties.

The inventive concept herein extends Lewis acid catalyzed hydrosilylation to the silylation of metalloid, alkali and transition metals to yield highly pure, nonaqueous binary and ternary compositions. These compositions are most commonly synthesized by the sol-gel method to obtain binary or ternary siloxane derivatives.

For example, the synthesis of borosiloxane (=B—O—Si≡) has been demonstrated by the sol-gel process wherein hydrolysis and polycondensation of boric acid [8a,b] and trialkyl borates [9a-c] with alkoxysilanes and silanols yields =B—O—Si≡ bridge formation [9a].

However, the limiting features of the this synthetic route are lack of purity, efficiency and control over fidelity, thus limiting high level molecular shaping resulting in less than optimal physical properties of these materials. The ability to make the =B—O—Si≡ bridge in nonaqueous conditions at room temperature has never been reported to the knowledge of this inventor. Furthermore, published synthetic routes at elevated temperature are cumbersome and inefficient observed by the lack of diversified synthetic procedures in the literature.

In a typical sol-gel derived borosiloxane (=B—O—Si≡) resin, the final loading of B is significantly small with respect to Si owing to a boric acid thermodynamic sync [10]. In the densified oxide state with high boron loading, the predominant species observed is the =B—O—B= bridge, while the minor is =B—O—Si≡. Moreover, the rate of hydrolysis is very slow, on the order of days to weeks.

Similarly, halosilanes can be reacted with alkoxyboranes in the presence of Lewis acids to yield polyborosiloxanes [11a, b]. However, the synthetic procedure described in WO2009/111193A1 is cumbersome insomuch it is multistep requiring hours of elevated temperature and several isolation and drying steps. Thus there is a continuing need to develop highly efficient, chemically controllable, environmentally benign and cost effective synthetic methods to produce functional, as-prepared, binary siloxanes like polyborosiloxane and ternary siloxanes of varying formulation therefrom. Of technical priority is the ability to produce a stable borosiloxane resin with controllable Si:B stoichiometry such that intrinsic thermal, adhesive, ion-conducting and bioactive potential can be exploited.

SUMMARY OF THE INVENTION

The invention detailed herein relates to, in part, a new condensation reaction between silanes ($R_3Si$—H) and an alkaline, transition metal or metalloid alkoxide in the presence of a lewis acid to yield a siloxy-alkaline, siloxy-metal or siloxy-metalloid, silane-alkaline, silane-metal or silane-metalloid bond where the final product is used to create a benign interface between a metallic anode and an electrolyte. Certain embodiments of this invention relate to crosslinked networks produced thereby. Other particular embodiments further relate to binary and ternary crosslinked products and applications thereof. Yet other particular embodiments relate to specific electrochemical cell configurations.

The motivation of this work was to find economical and environmentally benign synthetic methodologies to access a new platform of binary and ternary hybridized siloxy derived architectures that require no purification for use in a wide array of industry significant applications such as electrochemical energy storage, biomedical, preceramics for coatings and semiconductors, optoelectronics, energy conversion and storage devices, turbine metal coatings and aerospace. The method and application, herein, can achieve stoichiometric Si:B control, 500:1≥Si:B≥1:100 to the extent that new applications and structure/function relationships can now be explored and exploited. Specifically, as a corrosion inhibitor on metallic anodes which prolongs the practical shelf life of electrochemical energy storage devices.

In one embodiment, a hybrid siloxy derived resin is provided made by the process of reacting a silane and an alkaline, transition metal or metalloid alkoxide, in the presence of a lewis acid.

In another embodiment, the hybrid-siloxy derived resin is selected from the group consisting of binary cross-linked, ternary cross-linked, cross-linked network; and borosiloxane.

In yet another embodiment, the hybrid siloxy derived resin has a stoichiometric Si:B ratio between 500:1 and 1:100.

In a further embodiment, a method for producing hybrid siloxy derived resins is provided, comprising: reacting a silane and an alkaline, transition metal or metalloid alkoxide, in the presence of a lewis acid.

In another embodiment, the method of para [24], produces a hybrid-siloxy derived resin selected from a group consisting of binary cross-linked; ternary cross-linked; cross-linked network; and borosiloxane.

In yet another embodiment, the method produces a hybrid-siloxy derived resin wherein the stoichiometric Si:B ratio is between 500:1 and 1:100.

In yet another embodiment, the method can be conducted at room temperature.

In yet another embodiment, an energy storage device is provided comprising Li "doped" hybrid siloxy derived resin, wherein it is made by the process of reacting a silane and an alkaline, transition metal or metalloid alkoxide, in the presence of a lewis acid.

In yet another embodiment, an energy storage device is provided comprising an alkaline earth "doped" hybrid siloxy derived resin (i.e. calcium, magnesium, strontium, barium), wherein the hybrid siloxy derived resins are made by the process of reacting a silane and an alkaline, transition metal or metalloid alkoxide, in the presence of a lewis acid.

In a further embodiment, said hybrid siloxy derived resin and "doped" hybrid siloxy derived resin is used as a thin film passivant on metallic anodes and/or composite cathodes in electrochemical cells.

Provided is a non-aqueous, catalyzed condensation reactions between alkaline earth, transition metal and metalloid alkoxides with linear, branched or oligomeric hydrosilanes. These reactions proceed at room temperature to 50° C. on the order of minutes to several hours with an appropriate Lewis acid. The intrinsic purity of these reactions is related to room temperature autogenous byproduct removal of low boiling alkanes like methane, ethane and the like.

In one embodiment, this invention relates to a synthetic method to produce boron containing siloxanes, known commonly as borosiloxanes. Said synthetic procedure consists of mixing constituents at less than 100° C. is preferred, less than 60° C. is more preferred and less than 30° C. is most preferred in the presence of a Lewis acid. Such acids can be but not limited to, $B(C_6F_5)_3$, $SF_4$, and $PCl_5$; most preferably $B(C_6F_5)_3$. Condensation initiates instantly and rapidly proceeds to completion at near ambient conditions.

In another embodiment, this invention relates to a method of synthesis to produce binary metal siloxy derived products including but not limited to siloxanes of: zirconium, zinc, cerium, titanium, tungsten, iron, lithium, calcium, magnesium, tin, barium and strontium. In further embodiments, this invention relates to a method of synthesis to produce binary metalloid siloxy derived products including but not limited to, boron, sulfur, phosphorous and arsenic.

In yet a further embodiment, this invention relates to said products as precursors to silicate ceramics. It is widely known that sol-gel derived siloxanes are common starting materials to form silicate ceramic coatings such as borosilicate glass. Said synthetic method can be used to produce liquid resins to coat said products on metal substrates which can then be calcined at high temperature to form densified ceramic phases.

In yet a further embodiment, the invention relates to methods of use whereby no purification processes or process steps are required (purification-free) in that said raw products are directly applied to fabrication processes such as, but not limited to electrode coatings, encapsulation, binding, interconnection and insulating. Accordingly, there is no need for washing, extraction and drying steps.

Curing from liquid to solid proceeds simply by the evaporation of solvent in combination with elevated heat to form robust, mechanically hard, adhesive and optically transparent product.

In another embodiment, hybrid siloxy derived resins can be produced without heating the reaction.

In one embodiment, hybrid siloxy derived resins can be produced without the use of silanols and silicon alkoxides as silicon sources.

In yet another embodiment, hybrid siloxy derived resins can be produced without the use of strong acid/base catalysis to initiate hydrolysis (i.e. steps required in the sol-gel method).

In a further embodiment, the said liquid product is coated on a metallic electrode by dipping the metallic member in the as-prepared resin (submerging the member fully then immediately removing) followed by rapid heating to drive off solvent whereby a hard, conformal, adhesive, densified film is formed on the metallic member.

In yet a further embodiment, the coated metallic electrode is placed in an electrochemical cell with a liquid electrolyte and composite cathode in which the rate of open circuit corrosion is significantly reduced.

In a further embodiment, a stable room temperature metal-sulfur electrochemical cell is produced, more specifically a calcium, magnesium or lithium-sulfur cell is created whereby the open circuit potential is stabilized and self-discharge mechanisms are significantly sequestered.

In yet a further embodiment, a "passivated" metallic calcium (anode) is combined with composite sulfur (cathode) in a calcium based nonaqueous solution (electrolyte) to make a stable electrochemical energy storage cell.

In yet a further embodiment, "passivated" metallic magnesium (anode) is combined with composite sulfur (cathode) in a magnesium based nonaqueous solution (electrolyte) to make a stable electrochemical energy storage cell.

In another embodiment, the hybrid siloxy derived resin or "doped" hybrid siloxy derived resin material is used as a passivant on the positive electrode of electrochemical energy storage cells. Said material can be applied to the "active material", known to those skilled in the field as the material which intercalates or reacts with the cation. The passivant can be applied directly or indirectly. Direct application delineates the formation of a passivant film solely on the active material itself before it's processed into a composite cathode. Indirect application delineates the formation of a passivant film on the surface of a composite cathode, typically including the active material, conductive carbon, polymeric binder and other additives.

In a further embodiment, the binary or ternary hybrid siloy derived resin material is coated directly on lithium manganese oxide.

In yet a further embodiment, the borosiloxane or "doped" borosiloxane material is coated directly on sulfur infiltrated carbon.

In another embodiment, borosiloxane solutions or "doped" borosiloxane solutions can be used as a dispersant for oxide nanoparticles, including but not limited to the amorphous and crystalline forms of $SiO_2$, $TiO_2$, $W_2O_3$, $V_2O_3$, $CeO_2$ and ZnO enabling a delivery media to produce mechanically hard, adhesive composite nanoparticle films.

In a further embodiment, a method to electrochemically charge and discharge a calcium-sulfur electrochemical cell is provided.

Relevant applications, properties and broad utility including various other crosslinked formulations of the present invention will become apparent as one references the detailed description and appended claims.

DETAILED DESCRIPTION OF THE INVENTION

Figure 1:
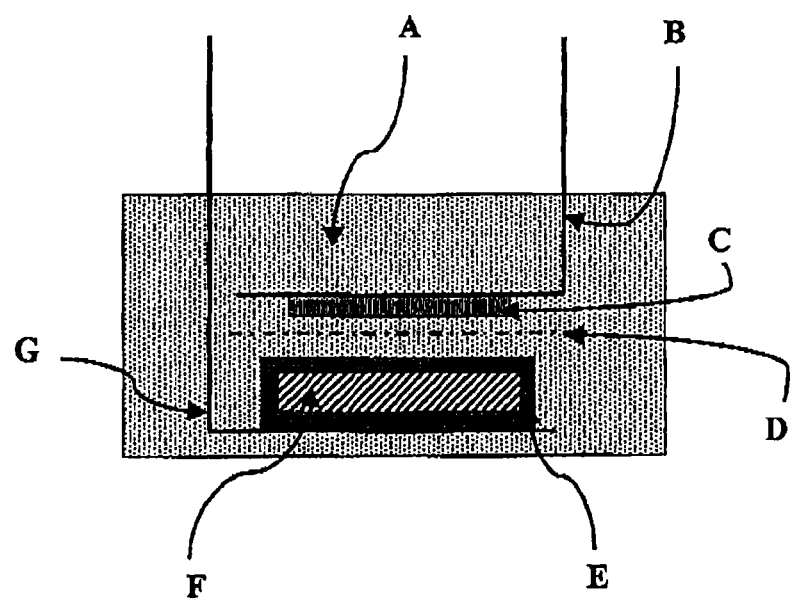
FIG. 1 shows an electrochemical cell comprising an electrolyte (A), positive electrode current collector (B), positive electrode (C), separator (D), said coating material (E) encapsulating a negative electrode (F) in contact with the negative electrode current collector (G).
Figure 2:
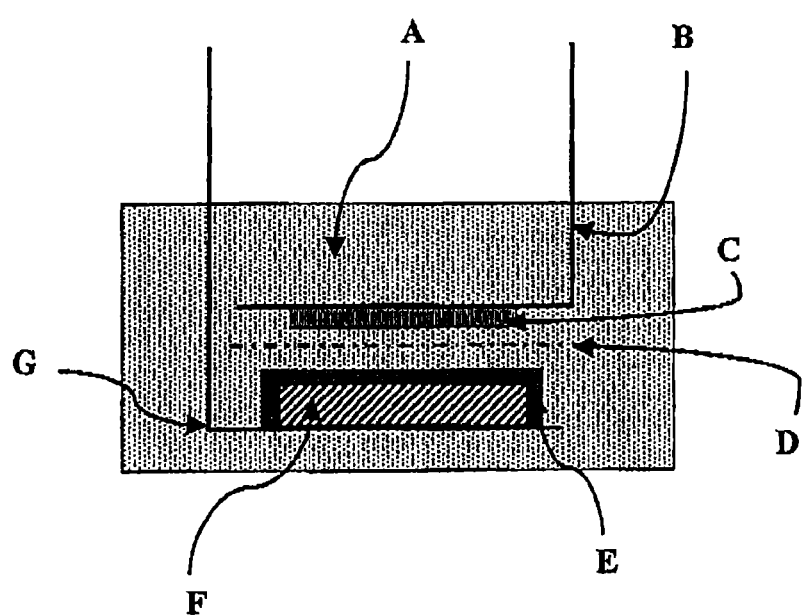
FIG. 2 shows an electrochemical cell comprising an electrolyte (A), positive electrode current collector (B), positive electrode (C), separator (D), said coating material (E) encapsulating a metallic negative electrode (F) where the negative electrode is in direct contact with the negative electrode current collector (G).
Figure 3:
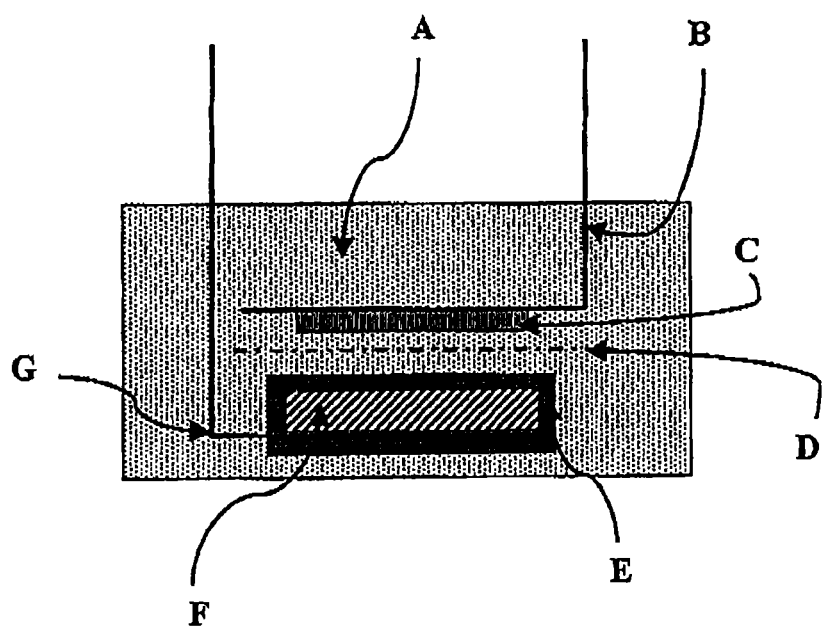
FIG. 3 shows an electrochemical cell comprising an electrolyte (A), positive electrode current collector (B), positive electrode (C), separator (D), said coating material (E) encapsulates both a metallic negative electrode (F) and the negative electrode current collector (G) where the metallic anode is in direct contact with the current collector.
Figure 4:
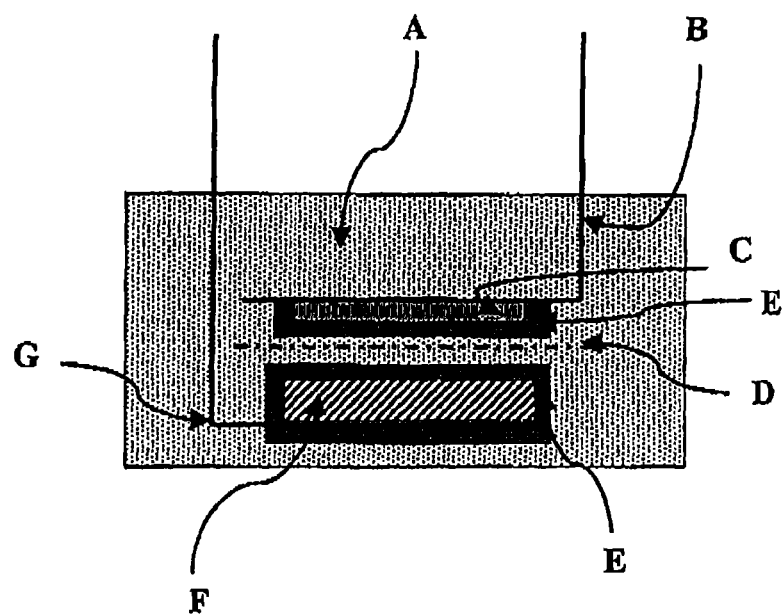
FIG. 4 shows an electrochemical cell comprising an electrolyte (A), positive electrode current collector (B), positive electrode (C) where the electrode is encapsulated by said coating material (E), separator (D), said coating material (E) encapsulating both a metallic negative electrode (F) and the negative electrode current collector (G) where the metallic anode is in direct contact with the current collector.
Figure 5:
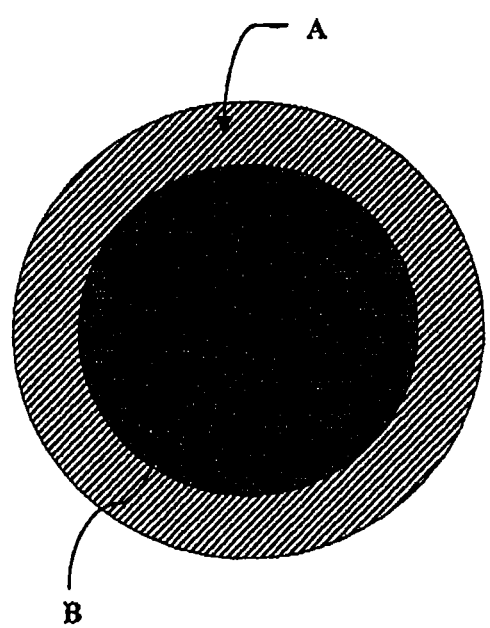
FIG. 5 shows said hybrid coating (A) encapsulating an active material particle consisting of a transition metal oxide, transition metal phosphate, mesoporous carbon infiltrated with sulfur, bimodal carbon infiltrated with sulfur or graphene aggregates infiltrated with sulfur (B).

Materials and Methods for the Production of Binary and Ternary Hybrid Siloxy Derived Resins The following will describe general starting materials used to produce intrinsically pure nonaqueous borosiloxane products. As one skilled in the art will recognize, the following generalized structures are not limited in scope to said structures and that each reactant may vary in purity, molecular weight or polydispersity. Said borosiloxane products can be derived from any one element (now referred to as "constituent element") of a, b and c or a mixture of elements within a and b, in the following: a. an alkoxyborane or alkoxyboroxine species; b. a hydridosilane or hydridosiloxane species; and c. a Lewis acid species Examples of alkoxyborane or alkoxyboroxine species can include, but are not limited to, the following:

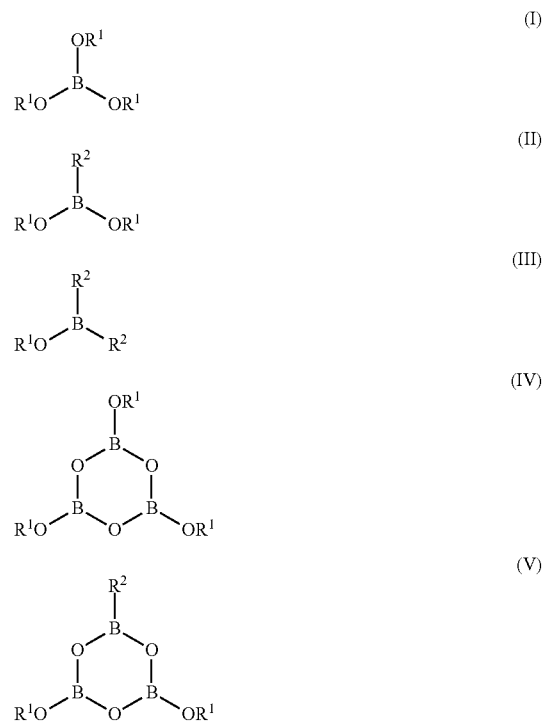

-continued

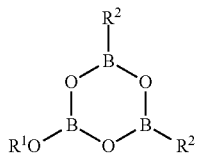
(VI)

where $R^1$=alkyl (such as, but not limited to, methyl, ethyl, propyl, isopropyl, butyl, sec-butyl, tert-butyl) and aryl;

where $R^2$=Alkyl, aryl, $C_1$-$C_{20}$ aliphatic radical, cycloaliphatic radical, aromatic radical, allylic radical a hydrocarbon aliphatic, cycloaliphatic or arylaliphatic radical or substituted aliphatic, cycloaliphatic or arylaliphatic radical in which substituted groups are selected from heteroatoms such as O or S, or methyl, ethyl, isopropyl, allyl, methallyl, benzyl, morpholyl, methylthioethyl, groups and so forth, Hydridosilane function constituent elements can be, but not limited to, any one of the following structures (VII)-(XVIII):

(VII)

(VIII)

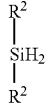
(IX)

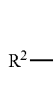
(X)

(XI)

(XII)

(XIII)

(XIV)

(XV)

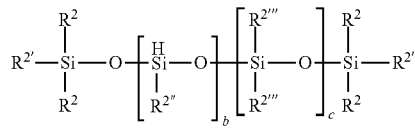
(XVI)

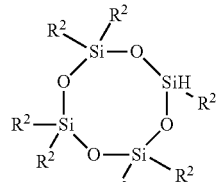
(XVII)

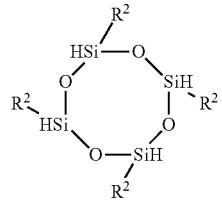
(XVIII)

where $R^2$, $R^{2'}$ and $R^{2''}$ Alkyl, aryl, $C_1$-$C_{20}$ aliphatic radical, cycloaliphatic radical, aromatic radical, allylic radical a hydrocarbon aliphatic, cycloaliphatic or arylaliphatic radical or substituted aliphatic, cycloaliphatic or arylaliphatic radical in which substituted groups are selected from heteroatoms such as O or S, or methyl, ethyl, isopropyl, allyl, methallyl, benzyl, morpholyl, methylthioethyl, groups and so forth are independent in each instance representing linear or branched $C_1$-$C_{20}$ aliphatic radical, cycloaliphatic radical, aromatic radical, allylic radical and "a" is an integer from 1 to 8 and "b" is an integer from 1 to 10,000 and "c" is an integer from 0 to 15,000 wherein the sum of "b"+"c" must be in the range of 2 to 20,000 inclusive.

Constituent element concentration and boron precursor to silane precursor ratios with respect to one another influences the homogeneity during the reaction trajectory towards condensation. Functional hydridosilanes and hydridosiloxanes with functional groups such as thiol, ester, OH, ethers etc. of sufficiently low viscosity. (between 0.1 to 10000 CPS) can be reacted with an alkoxylated boron in concentrated form.

Instances where branched, multifunctional, oligomeric and/or polymeric hydridosilanes are used as a primary or secondary constituent elements, solvents are needed. A primary constituent element indicates there are two or more species of that family (hydridosilane) in the reaction mixture. Thus, the primary constituent element is the one in excess. The secondary constituent element is therefore present in limiting amount. For example, if structure XII constituted 80 mol % SiH and structure XVI constituted 20% SiH, then structure XII is said to be the primary constituent element.

Aprotic solvents are preferable, non-coordinating aprotic solvents are more preferable and dry (water-free), aprotic, non-coordinating solvents with boiling points less than 120° C. are most preferable. Examples of these solvents include, but are not limited to toluene, dichloromethane, chloroform, hexane, and cyclohexane. In some instances it is preferred to use mixtures of solvents to stabilize polar/nonpolar intermediate products. For example, a mixture of toluene and dichloromethane is effective to stabilize a highly boronated siloxane reaction trajectory. 1 part chloroform to 0.5 part toluene is preferable, 1 part chloroform to 1 part toluene is more preferable, 1 part chloroform to 1.25 parts toluene is most preferable. In other instances where the Si:B ratio is greater than 1, single solvent systems are adequate to support the reaction trajectory.

Constituent element concentrations in these reactions become more important when highly branched products are generated. As the rapid condensation of B—O—Si bridges progress, in some instances, the product can undergo precipitous coagulation forming either gelatinous masses on the reactor walls, floating on top of the solvent or a singular gelled monolith in the reactor. For example reacting a trialkoxyborane with a dihydridosilane would require a greater dilution than when a trialkoxyborane is reacted with a monohydridosilane.

Constituent element ratios influence the percent conversion of alkoxyborane to a boron bound to oxygen then silicon (the extent of =B—O—Si= bridging). For instance, if the mol % of alkoxide bound to boron is equivalent to the mol % hydride bound to silicon then the resulting product contains 10% B—OH irrespective of catalyst loading, heat applied or injection speed. It is preferred to produce a product containing little or no B—OH functions. Thus, it is necessary that the hydride constituent is in excess while the alkoxide is a limiting reactant. In some instances, mixtures of two distinct hydride constituents and/or two distinct alkoxylated boranes can be reacted. In these instances, the sum of the hydride functions should be in excess by at least 3 mol % to the sum of the alkoxide functions inclusive. It is known that $B(C_6F_5)_3$ cause hydridosiloxanes to scramble. Thus in accordance with the high efficiency of said reactions, it was found that alkoxyborane and $B(C_6F_5)_3$ can be added nearly simultaneously to reduce the probability of siloxane scrambling.

Figure 12:
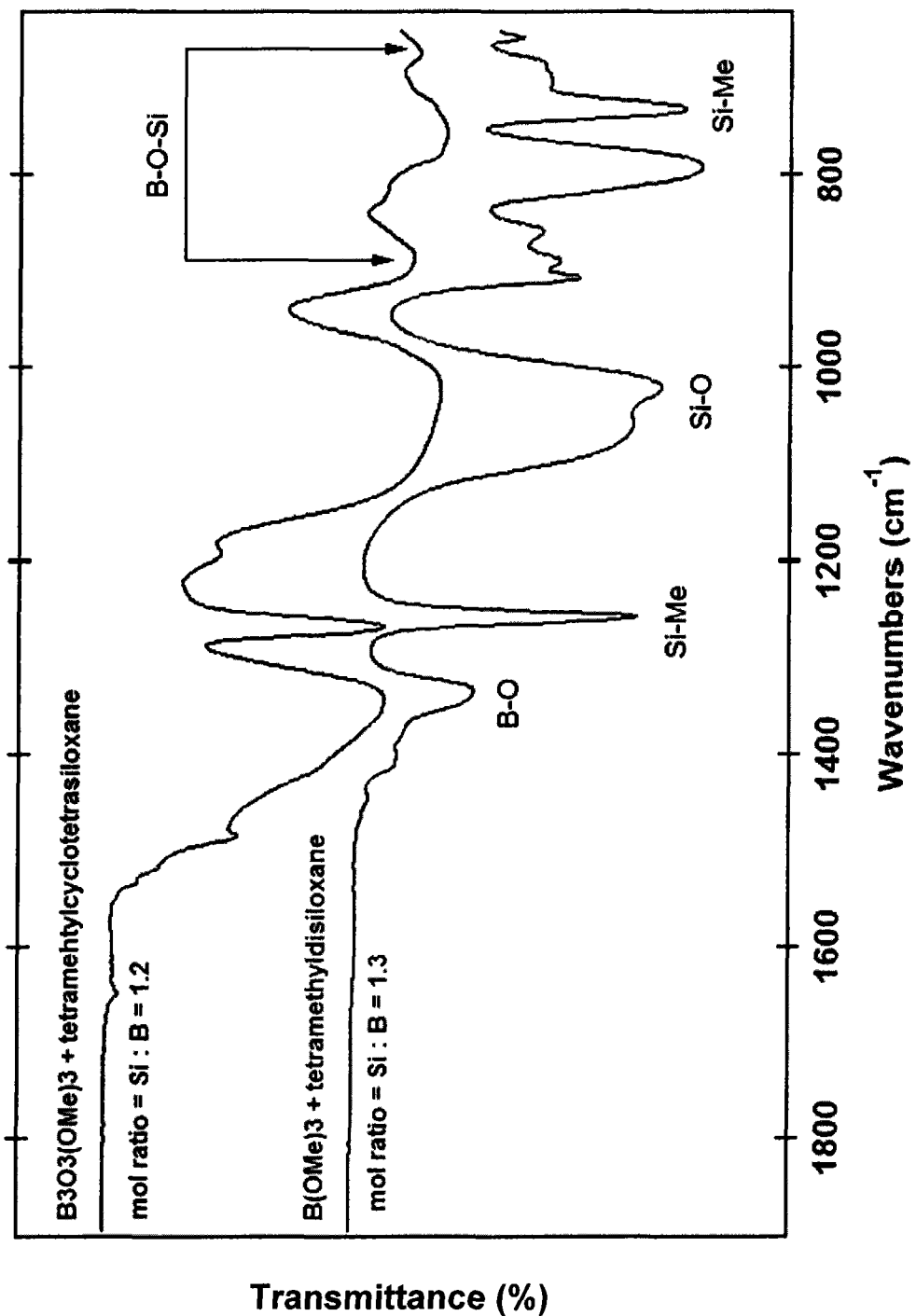
FIG. 12 is represents the characteristic infrared signatures of borosiloxane prepared with two different hydridosilane precursors and two different boron alkoxide. At low wavenumbers, boron-oxygen and boron-oxygen-silicon are clearly identified.

When the most dense =B—O—Si= bridging is desired, the nature of the starting material becomes critical. Simply adjusting the stoichiometry of B and Si containing reagents according the embodiment vida supra will not guarantee dense bridging. For instance, reacting trimethoxyborane with tetramethyldisiloxane compared to reacting trimethoxyboroxine with tetramethylcyclotetrasiloxane in the same stoichiometry will yield a resin with different properties, graphically demonstrated in the infrared spectra (FIG. 12). Trimethoxyboroxine+tetramethylcyclotetrasiloxane displays nearly equivalent integrated Si—, B—O and B—O—Si fingerprints.

In a typical synthesis, the solvent(s), if needed, are loaded in the reactor followed by the addition of hydridosilane. If the desired product is a small boron siloxide, the catalyst can be loaded next, followed last by the slow addition of alkoxyborane. Slow, titration speed, loading of the alkoxyborane is preferable to promote a stable reaction mixture. If added too fast, the reaction solution could bump violently from uncontrolled evolution of gaseous byproducts causing instability. Most reactions do not require direct heat to proceed. Once the hydride siloxane, $B(C_6F_5)_3$, and alkoxyborane are mixed, instantaneous condensation occurs. Once all alkoxide functions are consumed the reaction is complete. Following the preferred addition sequence described previously, the typical time scale of a reaction trajectory is proportional to the addition rate of the alkoxyborane at room temperature. No elevated heat was needed to drive the reaction to completion. This was confirmed directly after the addition of the alkoxyborane by spectroscopic analysis where no hydroxide or alkoxide functions were detected.

Ternary hybrid siloxy derived resins can also be achieved, in contrast to the binary systems described above. Ternary systems can be achieved in one of two ways, direct conversion of the constituent element or indirect conversion whereby the ternary constituent is added after the condensation of hydridosilane and borane. The ternary constituent is typically an alkali, alkaline earth or transition metal alkoxide. An implied prerequisite for all constituent precursors thus far have been that each element is homogeneously dispersed in a solvent or is a free flowing liquid. Hydridosilanes, for example, are generally liquids at room temperature. Alkoxyboranes, used herein, are liquids at room temperature. Thus, the constituent elements of binary forms of hybrid siloxy derived resins need only be diluted to the proper concentrations, prior to condensation and in some cases can be used in neat form.

In contrast, ternary constituent elements of alkali, alkaline earth or transition metal alkoxides are typically solid at room temperature, exhibiting melting points far above practical laboratory processes as claimed herein. Therefore, such ternary constituent elements must be solubilized prior to direct conversion (condensation). The organic media used as solvents described herein (toluene, dichloromethane, hexanes and the like) are not polar enough to facilitate solvation of these so-named classes of electropositive ternary constituent elements. Solvation can easily be accomplished by stoichiometric addition to the alkoxyborane constituent element where the solution phase equilibrium of the borane alkoxide function drives the solubility of the electropositive ternary alkoxide function rendering a stable, homogeneous cation solution. This now can be used as the "doped" precursor solution in the condensation between a hydridosilane and an alkoxyborane and an alkali, alkaline earth or transition metal alkoxide thereby yielding a product so-named a ternary hybrid siloxy derived resin.

In the situation where a ternary constituent element undergoes indirect conversion, that is, the constituent element is added after the condensation of a hydridosilane and alkoxyborane constituent elements, no pre-solubilization is necessary. The electropositive constituent elements of alkali, alkaline earth or transition metal alkoxides can be massed stoichiometrically on a balance and added directly into the neat reaction solution containing the dissolved product so-named hybrid siloxy derived resin. The solid ternary constituent quickly gains solubility by equilibrating the alkoxide function with the =B—O—Si= bridge thereby yielding a product so-named a ternary hybrid siloxy derived resin.

Examples of alkali, alkaline earth and transition metal alkoxides can include, but are not limited to, the following:

(XIX)

(XX)

(XXI)

(XXII)

(XXIII)

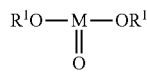

(XXIV)

where $R^1$=alkyl (such as, but not limited to, methyl, ethyl, propyl, isopropyl, butyl, sec-butyl, tert-butyl) and aryl; M represents a group 1 element in (XIX), a group 2, 7, 8, 10 and 14 element in (XX), a group 4 element in (XXI), a group 5 element in (XXII), a group 6 element in (XXIII), and a group 9 element in (XXIV).

Irrespective of the constituent classification of binary or ternary hybrid siloxy derived resins, it is preferred that the mole ratio between the total alkoxide functions (M-OR) and the total hydridosilane functions (Si—H) be 1.25. It is more preferable that the mole ratio between the total alkoxide functions and the total hydridosilane functions be 0.75. It is most preferable that the mole ratio between the total alkoxide functions and the total hydridosilane functions be 0.95.

It is most preferable to utilize low boiling point solvents. This is because said products can be applied directly to processes such as coating, encapsulation, binding and sealing. The curing (solidification) or densification is driven by the evaporation of solvent in combination with elevated temperature. Thus no additional reagents, cross-linkers or catalysts are required for this process. It is preferable to apply the as-prepared product to the described processes. It is preferable that curing is carried out with elevated heat such as a convection oven, indirect heat such as infrared, intrinsic heat such as microwave or forced air such as a hot air dryer. Curing can also be effectively carried out by applying the liquid resins to preheated members and substrates such that the latent heat from the members or substrates initiates and completes the densification process. Additionally, curing can be carried out at low temperatures with the assistance of very low pressure (vacuum).

Methods of Using Hybrid Siloxy Derived Resins

It is possible to use the hybrid siloxy derived resins, made by the processes disclosed herein, in numerous areas such as, but not limited to; corrosion inhibiting films, high brightness LED encapsulant, Electrolytes for Li-ion conductors, Electrolyte for dye sensitized solar cell, Semiconductor encapsulant, JET/turbine coating, Preceramic polymers, Oxidation resistivity of carbon fiber, New photoresists in lithography, Multifunctional hybrid glass using borosiloxane as high boron content precursor, Heat impact resistant films and coatings, Radioactive protective materials for nuclear power plants, liquid crystal resins, Flame retardant resins, Flat Panel TV scratch resistant films, Medical adhesive with intrinsic antiseptic/antifungal property, Contrast agent for MRI siloxane and Boron neutron capture therapy (BNCT), Boron core dendrimers, Prosthetics and orthotics interface to bone/tissue, Artial stent coating, Dental adhesives and composites, Biocompatible radiation absorber such as sunscreen, Factor selectively targets as boronated dendrimers to tumor vasculature.

For instance, in one embodiment, the binary or ternary hybrid siloxy derived resin can easily be applied to metallic electrodes in electrochemical energy storage cells; lithium, sodium, magnesium and calcium foils for example. In a contiguous process, the resin is prepared as referenced above. The resin constitutes a binary or ternary hybrid siloxy derived product, $B(C_6F_5)_3$ catalyst and the supporting organic solvent. Metallic electrodes are then dipped into the liquid product resin, immediately extracted and placed on a pre-heated clean glass substrate atop a hot plate. The hot plate can be pre-heated from 30° C. to 500° C. The heating limitation is simply based on the metallic member's melting temperature. A few minutes later, the metallic member can be removed from the heat and either stored for later use or reprocessed with additional coatings. The metallic member is then said to be "passivated". It is preferable to have three coatings, more preferable to have two coatings and most preferred to have one coating.

In another embodiment, the passivated metallic electrode (lithium, sodium, magnesium, calcium foil) is used as a counter electrode (CE) in an electrochemical energy storage cell. The passivant on the metallic CE mitigates several phenomena that are detrimental to the shelf life of sulfur based electrochemical energy storage cells.

Composite working electrode (WE) passivation is also beneficial. Promising Li-ion intercalation type electrodes are known to participate in detrimental side reactions with the electrolyte. For instance, spinet type lithium manganese oxide is an attractive candidate with a practical capacity of 100-130 $mAhg^{-1}$ at low C rates showing a working potential of 4.0V versus $Li/Li^+$. Similarly, olivine type lithium iron phosphate with a working electrode potential of 3.45V versus $Li/Li^+$ demonstrates a practical capacity of 150 $mAhg^{-1}$ at low C rates.

Both lithium manganese oxide and lithium iron phosphate have calendar limitations when cycled with lithium hexafluorophosphate based electrolytes. It's known that $Mn^{2+}$ and $Fe^{2+}$ ions leach out into the electrolyte at room temperature. At elevated temperature, the dissolution rate is accelerated resulting is rapid capacity fade. Thus, encapsulating the material or reformulating the electrolyte is a necessary process to achieve stable calendar maintenance.

In one embodiment, a binary or ternary or composite hybrid siloxy derived resin can be used as a passivant to block and/or minimize the rate of dissolution of transition metal ions from the cathode active material into the electrolyte. The active material powder can be coated directly or as a composite cathode consisting of active material, conductive carbon and binder. For instance, coating of loose powder can be achieved by making a slurry of a certain concentration of binary or ternary or composite hybrid siloxy derived resin to achieve a coating in which 15 wt % of the composite consists of densified passivant at the surface of the active material. A single coating up to 15 wt % is preferred, a double coating up to 15 wt % is more preferred.

A key parameter for any sulfur based electrochemical cell (sodium, lithium, potassium, magnesium, calcium) is "sulfur utilization". Sulfur utilization is primarily dependent on the electrolyte's ability to solubilize the intermediate sulfur species from high order to low order:

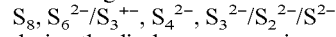

during the discharge conversion process and similarly during the charge conversion process back to cyclooctasulfur. It is commonly known in the lithium-sulfur community that balancing lithium salt solubility and intermediate polysulfide solubility must be carefully considered. For example, $Li_2S_6$ is known to have very high solubility, in excess of 10M, in 1,3-dioxolane compared to insolubility in propylene carbonate. Solubility is necessary for the electrochemical conversion to proceed. However, the high solubility has a detrimental side effect of leaching the active material out of the cathode into the bulk electrolyte thereby causing irreversible capacity loss.

In one embodiment, binary or ternary hybrid siloxy derived resin can be used as a pseudo-passivant on sulfur electrodes acting to "trap" soluble polysulfides and retain them in the cathode compartment, increasing the calendar maintenance.

Moreover, the denticity and coordination strength of the solvent towards the polysulfide intermediate also influences the efficiency of the conversion process. For example, multidentate solvents like glymes can create tight binding solvent sheaths around the polysulfide intermediates rendering it inactive to the conversion process toward lower order polysulfides thereby reducing the overall capacity of the electrochemical cell. It is now commonly understood to those skilled in the art that one of the most effective electrolytes for the lithium-sulfur system is a binary mixture of 1,3-dioxolane and dimethoxyethane with dissolved lithium bis(trifluoromethansulfonylimide). When considering calcium-sulfur, there is practically no information available about nonaqueous calcium-sulfur electrochemical systems.

In another embodiment, select calcium electrolytes have been screened for measuring the effectiveness of hybrid siloxy derived resin passivation on metallic calcium. Below is a survey of commercially available materials that have potential use in a calcium sulfur electrochemical cell as a nonaqueous electrolyte.

| | Solvent | | | | | | | |
|---|---|---|---|---|---|---|---|---|
| Salt | AN | PC | DMF | EMS | DMC | DME | DOL | TEGDME |
| $Ca(ClO_4)_2$ | S | S | | PS | | | | |
| $Ca((CF_3SO_2)_2N)_2$ | NS | S | S | S | S | S | S | S |
| $Ca(CF_3SO_3)_2$ | NS | NS | | S | NS | NS | PS | |
| $Ca(BF_4)_2$ | PS | NS | S | | | NS | PS | |
| $Ca(NO_3)_2$ | S | S | | | | | | |
| $Ca(SCN)_2$ | | | | | | | | | where AN = cetonitrile, PC = propylene carbonate, DMF = dimethylformamide, EMS = ethymethy sulfone, DMC = dimethylcarbonate, DME = dimethylether, DOL = 1,3-dioxolane, TEGDME = tetraethyleneglycodimethylether and the notions NS = not soluble, PS = partially soluble and S = soluble.

Choosing electrolyte salt combinations from the above chart for calcium-sulfur electrochemical cells, 0.8M to 0.5M $Ca(CLO_4)_2$ in AN is preferable and 0.8M to 0.5M $Ca(CLO_4)_2$ in a binary mixture of AN/TEGDME, 1/1 by volume, is more preferable. 0.8M to 0.5M $Ca((CF_3SO_2)_2N)_2$ in EMS is preferable and 0.8M to 0.5M $Ca((CF_3SO_2)_2N)_2$ in a binary mixture of EMS/TEGDME, 1/1 by volume, is more preferable.

In a further embodiment, a barrier film for low water and oxygen transmission is provided, comprising a hybrid siloxy derived resin, made by the process of reacting a silane and an alkaline, transition metal or metalloid alkoxide, in the presence of a lewis acid.

In another embodiment, an energy storage device is provided, comprising Li doped borosiloxanes, wherein the borosiloxanes are made by the process of reacting a silane and an alkaline, transition metal or metalloid alkoxide, in the presence of a lewis acid.

In yet another embodiment, a passivant or thin film coating is provided for down converted phosphors for light emitting diodes, comprising borosiloxanes made by the process of reacting a silane and an alkaline, transition metal or metalloid alkoxide, in the presence of a lewis acid.

In another embodiment, a scratch resistant coating for electronic display devices such as LCD TVs and LED TV's is provided comprising borosiloxanes made by the process of reacting a silane and an alkaline, transition metal or metalloid alkoxide, in the presence of a lewis acid.

EXAMPLES

All reagents were used as supplied with no purification unless otherwise specified. Reactions were either carried out under a blanket of nitrogen or in an argon filled glove box with dry reagent grade solvents. Electrode coating and electrochemical cell assembly were carried out in an argon filled glove box with moisture and oxygen levels below 0.1 ppm. All hydridosilanes and hydridosiloxanes were purchased from Gelest Inc. (Morrisville, Pa.). Borane and boroxine alkoxides were purchased from Aldrich Chemical Co. (Milwaukee, Wis.). The Lewis acid tris(pentafluorophenyl)borate, and metal alkoxides were purchased from Strem Chemicals, Inc. (Newburyport, Mass.). Lithium methoxide and lithium isopropoxide were purchased from Alfa Aesar (Ward Hill, Mass.). Silica nanoparticle solution suspended in methanol was obtained from Nissan Chemical (Houston, Tex.). Anhydrous perchlorate salts were purchased from GFS Chemicals (Powell, Ohio). Infrared spectroscopic analysis was performed on a Perkin Elmer ATR-IR spectrophotometer. Solution phase $^1H$ and $^{11}B$ magnetic spectroscopic analysis was carried out on a Bruker DMX500 SB FT-NMR. Electrochemical signature profiles were recorded on a Bio-Logic VMP3 potentiostat. Variable temperature x-ray diffraction was conducted on a Bruker D8 with an Anton Parr HTK 16 high temperature stage.

Example 1

Boron Siloxides

1a. Boron tris(triethysiloxide): Loaded a small round bottom flask with 10 ml toluene and 12 mmol of triethylsilane followed by 1.1 µmol $B(C_6F_5)_3$. At room temperature, 4.2 mmol trimethylborate was injected at an approximate rate of 0.1 ml/second. Once out-gassing ceased, approximately 5 minutes after precursor addition, the reaction is said to be complete.

1b. Boron tris(dimethylphenylsiloxide): Loaded a small round bottom flask with 10 ml toluene and 1.1 mmol of dimethylphenylsilane followed by 2 µmol $B(C_6F_5)_3$. At room temperature, 0.36 mmol trimethylborate was injected. Once out-gassing ceased, approximately 5 minutes after precursor addition, the reaction is said to be complete.

1c. boron tris(trimethysiloxide): Loaded a small round bottom flask with 20 ml dichloromethane and 26.4 mmol of triphenylsilane followed by 4.4 mmol trimethylborate. At room temperature, 13.1 µmol $B(C_6F_5)_3$ was injected into the reaction mixture. Once out-gassing ceased, approximately 12 hrs after precursor addition, the reaction is said to be complete.

1d. boroxine tris(triphenylsiloxide): Loaded a small round bottom flask with 10 ml dichloromethane and 14.5 mmol of triphenylsilane followed by 2.4 mmol trimethylboroxine. At room temperature, 7.2 µmol $B(C_6F_5)_3$ was injected into the reaction mixture. Once out-gassing ceased, approximately 12 hrs after precursor addition, the reaction is said to be complete.

Example 2

Polyborosiloxane

In a small flask open to air, placed 17 mmol 1,1,3,3-tetramethydisiloxane in 6 ml of hexane and 10 μmol $B(C_6F_5)_3$. This was followed by the room temperature addition of 9 mmol trimethylborate at an approximate rate of 0.1 ml/second. Once out gassing ceased, approximately 15 minutes after complete addition of precursors, the reaction is said to be complete.

Example 3

Cross Linking Methylhydrosilane Homopolymers with Methylborate

In a small flask open to air, placed 34 mmol (in Si—H) of a polymethylhydrosiloxane in 10 ml of hexane and 7 μmol $B(C_6F_5)_3$. This was followed by the room temperature addition of 15 mmol trimethylborate at an approximate rate of 0.1 ml/second. Once out-gassing ceased, approximately 15 minutes after complete addition of precursors, the reaction is said to be complete.

Example 4

Cross Linking Methylhydrosilane Copolymers with Methylborate

In a small flask open to air, placed 18.4 mmol (in Si—H) of a 50-55% methylhydrosiloxane—dimethylsiloxane copolymer in 10 ml of hexane and 20 μmol $B(C_6F_5)_3$. This was followed by the room temperature addition of 4.4 mmol trimethylborate at an approximate rate of 0.1 ml/second. Once out-gassing ceased, approximately 15 minutes after complete addition of precursors, the reaction is said to be complete.

Example 5

High Boron Content Extended Networks

In a nitrogen flushed round bottom flask, 40 ml of dry toluene and 32 ml of dry dichloromethane were loaded. 8.25 mmol of 1,3,5,7-tetramethylcyclotetrasiloxane was loaded in the reactor vessel. At room temperature, 0.011 mmol of $B(C_6F_5)_3$ in toluene and an appropriate amount of trimethoxyboroxine to yield the desired Si:B mol ratio up to 1:1. The alkoxide and catalyst solutions were added sequentially at an approximate rate of 0.1 ml/second. Once outgassing ceased, approximately 5 minutes after complete addition of precursors, the reaction is said to be complete.

Example 6

Ternary Alkali Metal: Lithium

In a nitrogen flushed round bottom flask, 10 ml of dry toluene and 10 ml of dry dichloromethane were loaded. Stock solutions of 0.14M lithium complexed with boroxine were prepared by mixing lithium methoxide with trimethoxyboroxine. 2.1 mmol of 1,3,5,7-tetramethylcyclotetrasiloxane was loaded in the reactor vessel. At room temperature, 58 μmol of $B(C_6F_5)_3$ in toluene and 2.62 mmol alkoxide complex were added sequentially at an approximate rate of 0.1 ml/second. Once out-gassing ceased, approximately 5 minutes after precursor addition, the reaction is said to be complete.

Example 7

Ternary Transition Metal: Zirconium

In a nitrogen flushed round bottom flask, 80 ml of dry toluene and 0.132 mol of 1,3,5,7-tetramethylcyclotetrasiloxane and 0.11 mol of zirconium(IV) ethoxide were loaded. At room temperature, 0.13 mmol of $B(C_6F_5)_3$ in toluene and injected. After 30 minutes or the observation that outgassing has ceased, the reaction is said to be complete.

Example 8

Indirect Formation of Ternary Transition Metal Formulation: Vandium and Titanium 8a. In a nitrogen flushed round bottom flask, 5.6 ml of dry toluene and 1.4 ml of dry dichloromethane were loaded. 3.13 mmol of 1,3,5,7-tetramethylcyclotetrasiloxane (normalized to moles of Si—H functions) was loaded in the reactor vessel. At room temperature, 30 μmol of $B(C_6F_5)_3$ in toluene and 0.1 mmol trimethoxy boroxine were titrated at a rate of 0.1 ml/second. Once outgassing ceased, approximately 5 minutes after complete addition of precursors, the reaction is said to be complete. Next, added 5 mmol of vanadium(V) oxytriethoxide (normalized to moles of V—OEt functions) was added to the siloxy derived product. The turbid brown solution was heated to 125° C. for 1 hour. The turbidity decreased by approximately 75%. The addition of dry methanol turned the solution clear, dark brown.

8b. In a nitrogen flushed round bottom flask, 10.8 ml of dry toluene and 2.8 ml of dry dichloromethane were loaded. 1.59 mmol of 1,3,5,7-tetramethylcyclotetrasiloxane was loaded in the reactor vessel. At room temperature, 0.040 mmol of $B(C_6F_5)_3$ in toluene and an appropriate amount of trimethoxyboroxine to yield the desired Si:B mol ratio up to 1:1. The alkoxide and catalyst solutions were added sequentially at an approximate rate of 0.1 ml/second. Once outgassing ceased, approximately 5 minutes after complete addition of precursors, the reaction is said to be complete. At this point, 6.9 ml of a 1.07M solution of titanium(IV) ethoxide in toluene was added to yield an approximate stoichiometry of Si:B:Ti=1:1:1.

Example 9

Ternary Alkaline Earth Siloxane: Calcium and Strontium

9a. Calcium methoxide was complexed with trimethoxy boroxine by making a 10M solution in dry toluene with a B:Ca mol ratio of 13:1 in an argon filled glove box. The solution was stirred for 18 hours at 50° C. In a 40 ml reaction vial, 7 ml of dry toluene, 2 ml of dry dichloromethane, and 3.13 mmol of 1,3,5,7-tetramethylcyclotetrasiloxane (normalized to moles of Si—H functions) were placed. At room temperature, simultaneously titrated 50 μmol $B(C_6F_5)_3$ and 4.45 mmol Ca/B solution at a rate of 0.1 ml/second. After 30 minutes or the observation that outgassing has ceased, the reaction is said to be complete.

9b. Strontium isopropoxide was complexed with trimethoxy boroxine by making a 10M solution in dry toluene with a Sr:Ca mol ratio of 13:1 in an argon filled glove box. The solution was stirred for 18 hours at 50° C. In a 40 ml reaction vial, 7 ml of dry toluene, 2 ml of dry dichloromethane, and 3.13 mmol of 1,3,5,7-tetramethylcyclotetrasiloxane (normalized to moles of Si—H functions) were placed. At room temperature, simultaneously titrated 50 μmol $B(C_6F_5)_3$ and 4.45 mmol Sr/B solution at a rate of 0.1 ml/second. After 30 minutes or the observation that outgassing has ceased, the reaction is said to be complete.

Example 10

Indirect Formation of a Group 14 Metal Ternary Hybrid Siloxy Derived Resin: Tin

In a nitrogen flushed round bottom flask, 5.6 ml of dry toluene and 1.4 ml of dry dichloromethane were loaded. 3.13 mmol of 1,3,5,7-tetramethylcyclotetrasiloxane (normalized to moles of Si—H functions) was loaded in the reactor vessel. At room temperature, 30 μmol of $B(C_6F_5)_3$ in toluene and 0.1 mmol trimethoxy boroxine were titrated at a rate of 0.1 ml/second. Once outgassing ceased, approximately 5 minutes after complete addition of precursors, the reaction is said to be complete. Next, 0.102 g of tin(II) methoxide was added to the siloxy derived product. The slurry was mixed at room temperature until the tin(II) methoxide was dissolved, yielding a clear, dark brown solution.

Example 11

Composite Hybrid Siloxy Derived Resins with Oxide Nanoparticles

Using the hybrid siloxy derived resin (see example 5), a composite film was derived by mixing an equivalent weight fraction of pro-formed, spherical 15 nm silica nanoparticles. Equivalent weight was determined by measuring the fraction of suspended solids in solution of the hybrid siloxy derived resin and silica nanoparticle solution. Mixed 500 mg of a 50 mg/ml solution of hybrid siloxy derived resin with 555 mg of a 555 mg/ml solution of silica nanoparticles in methanol followed by the addition of 3.3 ml dry methanol. The resulting solution was clear, colorless with birefringent optical properties.

Example 12

Curing Films on Rigid Substrates

12a. A thin film was deposited on a silicon substrate using the as prepared liquid resin obtained in examples 5 thru 11 by spin coating 1 ml of said solution at 1000 rpm for 30 seconds. The film was cured on a preheated hot plate at 150° C. for 5 minutes. The resulting film was mechanically hard, adhesive and scratch resistant.

12b. A thin film was deposited on aluminum foil by drawing down a solution obtained in examples 5 thru 11 with a wire wound bar. The wet foil was placed in a preheated oven at 150° C. for 10 minutes. The resulting film was mechanically hard, adhesive and scratch resistant and flexed with the foil without delaminating.

12c. A thin film was deposited on an oriented A4 size polyethylene terephthalate sheet by drawing down a solution with a wire wound bar obtained in examples 5 and 6 with a wire bar. The wet sheet was placed in a preheated oven at 80° C. for 10 minutes. The resulting film was mechanically hard, adhesive, transparent, scratch resistant and flexed with bending PET without delaminating or visual cracking.

12d. A thin film was deposited on a silicon substrate by drop-casting the as prepared liquid resin from example 11 on a silicon substrate. The film was cured on a preheated hot plate with an initial temperature of 50° C. and ramping to a final temperature 150° C. The resulting film was mechanically hard, adhesive and scratch resistant.

Figure 6:
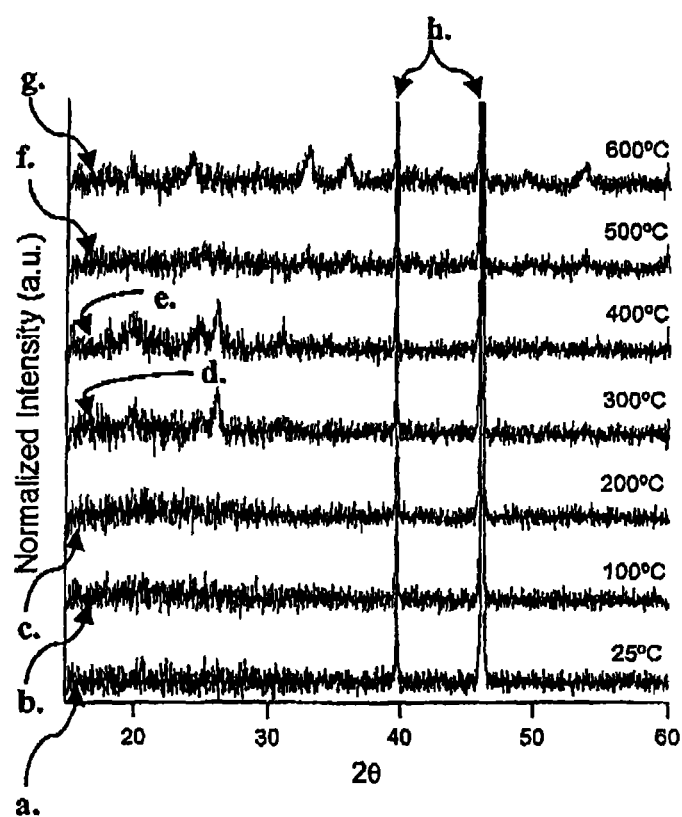
FIG. 6 demonstrates the characteristic crystalline phase transformations in a thin film of a hybrid siloxy derived resin prepared in example 12e as a function of densification temperature where said resin is amorphous at room temperature (a.), amorphous at 100° C. (b.), amorphous at 200° C. (c.), onset of the $V_2O_5$ phase at 300° C. (d.), $V_2O_5$ phase at 400° C. (e.), intermediate phase transition between $V_2O_5$ and $V_2O_3$ at 500° C. (f.) and the complete phase transformation to $V_2O_3$ at 600° C. (g.) where (h.) is indicative of the platinum substrate reflections.

12e. A thin film was deposited on platinum foil using the resin prepared in example 8a. The film was densified at 100° C. for 30 minutes. The passivated foil was transferred to an x-ray diffractometer fitted with a high temperature stage. X-ray reflections were monitored between 15° and 60° theta-theta as a function of temperature (see FIG. 6).

Example 13

Coating Hybrid Siloxy Derived Resins on Metallic Electrodes (Inventive)

13a. In an argon filled glove box, independent 10 mm by 0.1 mm lithium discs were prepared by scraping the surface with a stainless steel scalpel, exposing the fresh, reflective metallic surface. The members were immediately dipped in the as prepared hybrid siloxy derived resins prepared in examples 5, 6, and 10 respectively. The wet metallic members were transferred to a preheated hot plate, 140° C., for five minutes. The said members retained their highly reflective sheen after the coating process. The members were stored for later use.

13b. In an argon filled glove box, independent 11 mm by 0.5 mm calcium discs were scraped with a stainless steel scalpel to reveal a fresh, mirror-like reflective metallic surface. The members were immediately dipped in the as prepared hybrid siloxy derived resins prepared in examples 5, 7, 8, 9, and 10 respectively. The wet metallic members were transferred to a preheated hot plate, 350° C., for five minutes. The metallic members retained their highly reflective sheen after the coating process. The members were stored for later use.

13c. In an argon filled glove box, independent 11 mm by 0.1 mm magnesium discs were scraped with a stainless steel scalpel to reveal a fresh, mirror-like reflective metallic surface. The members were immediately dipped in the as prepared hybrid siloxy derived resins prepared in examples 5, 8, and 10 respectively. The wet metallic members were transferred to a preheated hot plate, 350° C., for five minutes. The metallic members retained their highly reflective sheen after the coating process. The members were stored for later use.

Example 14

Coating Hybrid Siloxy Derived Resins on Active Material Powders 14a. (inventive) In a flume hood, the weight percent of dissolved solids in the as prepared hybrid siloxy derived resins in examples 5, 8 and 11 were normalized to 30 mg/ml using dry methanol as a diluent. In a PFA vial, mixed 0.256 g lithium manganese oxide powder with 0.75 ml of the hybrid siloxy derived resin solution. The mixture was sonicated for 5 minutes prior to being transferred to a preheated PFA petri dish, 110° C., to drive the densification process. The composite material was recovered and lightly ground in an agate mortar before mixing with another portion of 0.75 ml hybrid solixoy derived resin, sonicated and densified yielding a composite coating of 15 wt %. The composite active material was recovered and lightly ground in an agate mortar to produce a free flowing powder. The powder was transferred to an argon filled glove box where it was further densified at 350° C. for 10 minutes in an alumina crucible.

14b. (inventive) Stacked graphene nanoplatelet aggregates (Strem Chemical, USA) were infiltrated with sublimed sulfur (Strem Chemical, USA) by the melt diffusion process. 1.448 g of nanoplatelets were ground with 2.604 g sulfur in an agate mortar before the mixture was transferred to a teflon lined stainless steel pressure reactor. The reactor was placed in a preheated oven at 155° C. for four hours where capillary action drives molten sulfur into the channels of the stacked graphene nanoplatelets. The infiltrated carbon was recovered and washed with a 10% solution of carbon disulfide in absolute ethanol to remove bulk sulfur from the outer surfaces of the sulfur infiltrated stacked graphene nanoplatelets. The washed said sulfur/carbon active material was characterized by thermal gravimetric analysis which showed 55 wt % infiltrated sulfur. Said material will now constitute the "active material" for a sulfur based electrochemical cell.

14c. (inventive) Diluted the as prepared hybrid siloxy derived resin prepared in examples 5 and 8 with cyclopentanone respectively to achieve a concentration of 0.7M in $(B_3O_3)_{1/3}(CH_3SiO_3)_{1/3}(VO_4)_{1/4}$ and $(B_3O_3)_{1/3}(CH_3SiO_3)_{1/3}$. Two separate PFA vials were loaded with 0.373 g each of active material prepared in example 14b followed by 1 ml of diluted hybrid siloxy derived resin in one and 1 ml diluted hybrid siloxy derived vanadate resin in the other. Sonicated slurries for 5 minutes. The slurries were transferred to two separate PFA petri dishes and heated to 60° C. under vacuum for 8 hours. The composite active material was retrieved at room temperature and lightly ground in an agate mortar. This is now said to be passivated active material.

Example 15

Coating Hybrid Siloxy Derived Resins on Composite Electrodes

Composite electrodes are referred to as a mixture of active material, conductive carbon additive and polymeric binder in a certain ratio which is slurry cast on a current collector (nickel foil, nickel foam, aluminum foil, carbon coated aluminum foil for example) to yield a self-supporting electrode.

15a. (Comparative) lithium manganese oxide, acetylene black, and polyvinylidene fluoride in a mass ratio of 94.5/2.75/2.75 with n-methylpyrrolidone and doctor bar coated on 15 μm thick aluminum foil. The wet film was transferred to an 85° C., continuous dry air purged oven for four hours. The dry film had a thickness of 0.1 mm.

15b. (Inventive) The composite electrode prepared in example 15a was cut into 12 mm circular discs. Inside of an argon filled glove box, circular electrodes were treated with hybrid siloxy derived resin prepare in example 8 by drop-casting 20 μL of a 18 mg/ml solution on the electrode followed by densification at 120° C. for 10 minutes. This process was repeated four times. The passivated composite electrodes were stored for later use.

15c. (Inventive) The composite electrode prepared in example 15a were cut into 12 mm circular discs. Inside of an argon filled glove box, circular electrodes were treated with hybrid siloxy derived resin prepare in example 11 by drop-casting 20 μL of a 90 mg/ml solution on the electrode followed by densification at 120° C. for 10 minutes. This process was repeated two times.

15d. (Inventive) A composite sulfur electrode was fabricated by mixing the native active material from example 14b with Super P conductive carbon and polyvinylidene fluoride in a mass ratio of 85/7.5/7.5 with cyclopentanone and doctor bar coated on 15 μm thick carbon coated aluminum foil. The wet film was transferred to a 60° C. vacuum oven for two hours. The dry film had a thickness of 0.050 mm. Circular 12 mm circular discs were cut and transferred to an argon filled glove box. The 12 mm electrodes were treated independently with hybrid siloxy derived resin prepare in examples 5 and 11 by drop-casting 20 μL of a 90 mg/ml solution on the electrode followed by densification at 120° C. for 10 minutes. This process was repeated two times.

15e. (inventive) The composite electrode prepared in example 15a were cut into 12 mm circular discs. Inside of an argon filled glove box, circular electrodes were treated with hybrid siloxy derived resin prepare in example 8b by drop-casting 20 μL of a 90 mg/ml solution on the electrode followed by densification at 120° C. for 10 minutes. This process was repeated two times.

Example 16

(Inventive) Fabrication of Calcium-Sulfur Electrochemical Cells

Figure 7:
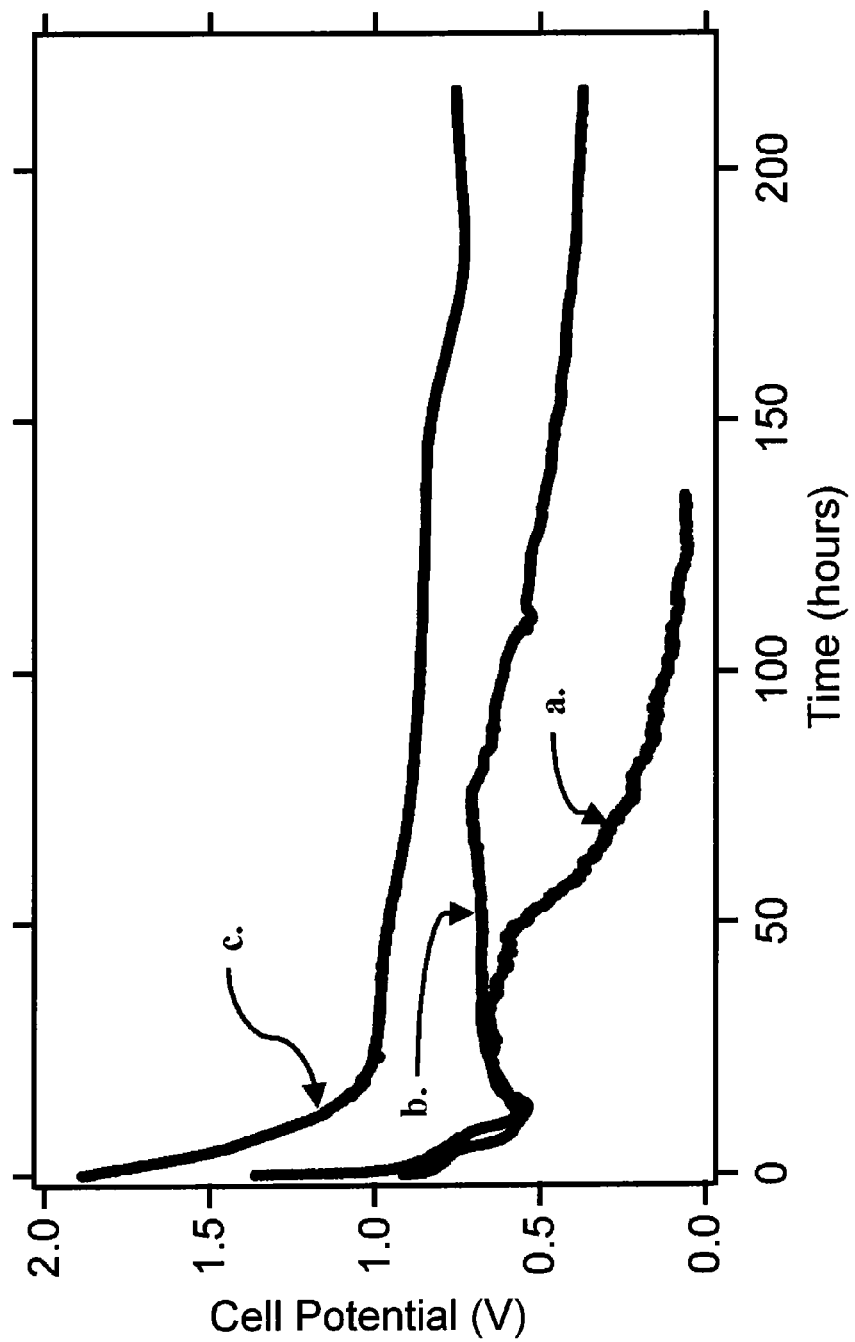
FIG. 7 represents signature traces of CR2032 calcium-sulfur electrochemical cell potential at open circuit as a function of time at room temperature (example 16a) where signature trace (a.) represents bare, uncoated calcium, counter electrode, and sulfur infiltrated graphene nanoplatelet aggregates working electrode, signature trace (b.) represents bare calcium and passivated sulfur infiltrated graphene nanoplatelets and signature trace (c.) represents passivated calcium and passivated sulfur infiltrated graphene nanoplatelets.
Figure 8:
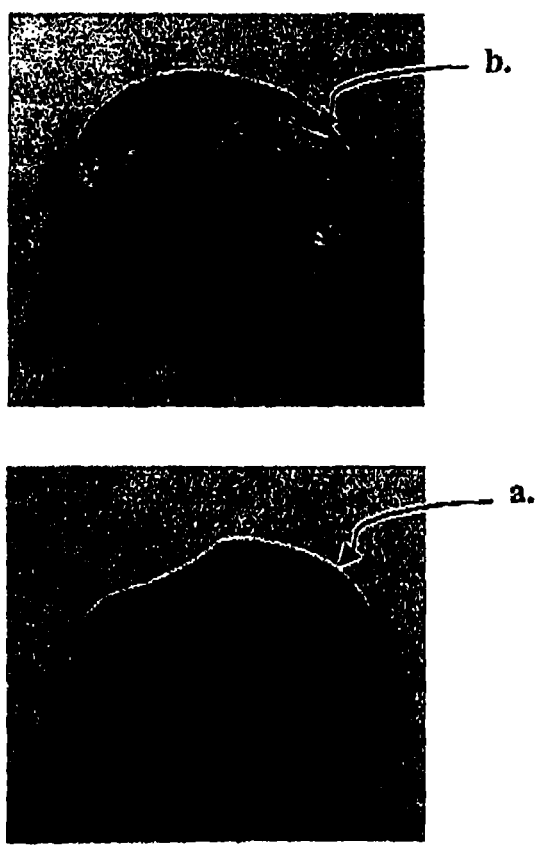
FIG. 8 shows the actual calcium counter electrodes extracted from cells measured in FIG. 7 (constructed in example 16a). Photograph (a.) demonstrates high level of corrosion at 12 days denoted by a severely blackened surface which was monitored as signature trace 7a. and photograph (b.) demonstrates a significantly lower degree of corrosion at 12 days which was monitored as signature trace 7c.

16a. To observe the corrosion inhibition and self-discharge suppression characteristics of the hybrid siloxy derived resin coatings, three Swagelok type calcium-sulfur cells were constructed comparing passivated and unpassivated electrode characteristics. The electrolyte consisted of 0.5M $Ca(ClO_4)_2$ in dry acetonitrile. The separator material used was nonwoven glass fiber (Whatman GF/D). Calcium counter electrode metal discs were 11 mm by 0.5 mm while the sulfur based cathode consisted of 12 mg of a mixture of sulfur infiltrated stacked graphene nanoplatelet aggregates mixed with Super P conductive carbon in a 90/10 weight ratio. Cell 1 was constructed from bare calcium metal and an unpassivated active material from example 14b. Cell 2 was constructed from bare calcium metal and passivated active material from example 14c (based on $(B_3O_3)_{1/3}(CH_3SiO_3)_{1/3}$). Cell 3 was constructed from passivated calcium from example 13b (based on $(B_3O_3)_{1/3}(CH_3SiO_3)_{1/3}$) and passivated active material from example 14c (based on passivated $(B_3O_3)_{1/3}(CH_3SiO_3)_{1/3}$). The cells were interfaced with a potentiostat where the open circuit cell potential was measure at 25° C. for 250 hours (10.5 days). FIG. 7 demonstrates the signature profiles of each cell: trace 7a represents cell 1, trace 7b represents cell 2 and trace 7c represents cell 3.

16b (inventive). A calcium-sulfur half-cell was constructed in a Swagelok™ type cell with the aim of observing charge/discharge behavior. The electrolyte consisted of a binary solution acetonitrile and tetraethyleneglycol dimethylether (1:1 by vol) with 0.5M calcium perchlorate. The counter electrode was borosiloxane coated calcium metal and the working electrode consisted of composite sulfur (see example 14B). One Celgard™ 2500 was used as the separator. The open circuit voltage was 2.0V. The initial discharge capacity was 450 mAh/g (with respect to sulfur) at a rate of C/10. The first charge capacity was 250 mAh/g at a rate of C/50. The second discharge/charge capacitates were 275 and 100 mAh/g respectively.

16c (inventive). A calcium-sulfur half-cell was constructed in a Swagelok™ type cell with the aim of observing charge/discharge behavior. The electrolyte consisted of a binary solution ethyl methyl sulfone and tetraethyleneglycol dimethylether (1:1 by vol) with 0.5M calcium perchlorate. The counter electrode was borosiloxane coated calcium metal and the working electrode consisted of composite sulfur (see example 14B). One Celgard™ 2500 was used as the separator. The open circuit voltage was 1.9-2.0V. The initial discharge capacity was 175 mAh/g (with respect to sulfur) at a rate of C/10. The first charge capacity was 60 mAh/g at a rate of C/50. The second discharge/charge capacitates were 80 and 25 mAh/g respectively.

Example 17

Fabrication of Lithium-Sulfur Electrochemical Cells

Figure 9:
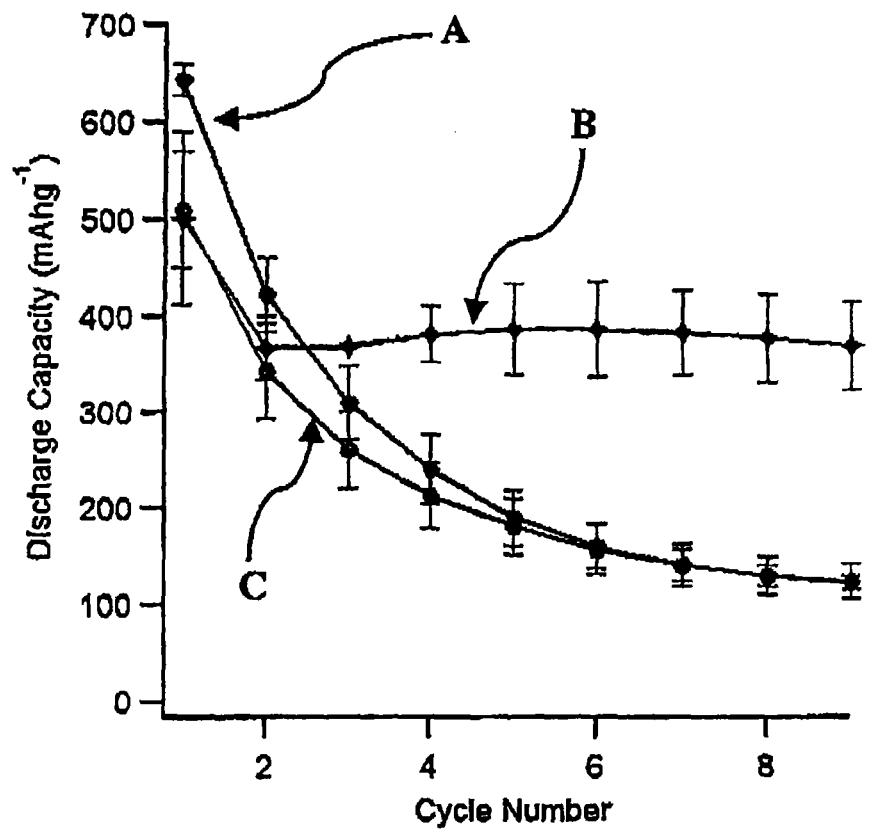
FIG. 9 demonstrates enhanced capacity retention in CR2032 lithium-sulfur electrochemical cells constructed according to examples 17a.-c. Trace (A) shows a typical bulk sulfur electrode has a rapid and continuous capacity fade during cycling. Trace (B) shows a passivated bulk sulfur electrode with a passivant form of $(B_3O_3)_{1/3}(CH_3SiO_3)_{1/3}$. Trace (C) shows a passivated bulk sulfur electrode with a passivant form of $(B_3O_3)_{1/3}(CH_3SiO_3)_{1/3}(VO_4)_{1/4}$.

To demonstrate enhanced capacity retention of passivated composite sulfur cathodes, three CR2032 button type lithium-sulfur cells were compared. The electrolyte consisted of 1M lithium bistrifluoromethanesulfonylimide in a mixture of 1,3-dioxolane and dimethoxyethane, 50/50 by volume (no SEI additives or polysulfide shuttle inhibitors were present). The separator used was Celgard 2400. The composite cathode was fabricated by mixing sublimed sulfur, Super P conductive carbon and polyvinylidene fluoride in a 60/30/10 weight ratio in n-methylpyrrolidone. The slurry was doctor bar cast on carbon coated aluminum foil and dried in a dry air purged oven at 65° C. for 8 hours. Lithium metal foil was used as the counter electrode. The capacity retention is illustrated in FIG. 9.

17a. (comparative) 12 mm circular composite sulfur discs were cut out to be used as the working electrode. Button cell was constructed in triplicate in a flooded electrode configuration. The cells were interfaced with a potentiostat under galvanostatic control. The cells were cycled at C/10 at room temperature (typically 22-25° C.). The capacity retention is shown as trace 9A. Results were averaged across all cells.

17b. Three 12 mm circular composite sulfur discs were cut out to be used as the passivated working electrode. A diluted dry methanolic solution of hybrid siloxy derived resin prepared in example 5 was adjusted to a concentration of 90 mg/ml. 20 uL of this solution was titrated on the surface of each of the three composite cathodes and dried at 60° C. for 1 hour in vacuum. This coating process was repeated once more. Three button cells were constructed in a flooded electrode configuration. The cells were interface with a potentiostat under galvanostatic control. The cells were cycled at C/10 at room temperature (typically 22-25° C.). The capacity retention is shown as trace 9B. Results were averaged across all cells.

17c. (inventive) Three 12 mm circular composite sulfur discs were cut out to be used as the passivated working electrode. A diluted dry methanolic solution of hybrid siloxy derived resin prepared in example 8a was adjusted to a concentration of 90 mg/ml. 20 uL of this solution was titrated on the surface of each of the three composite cathodes and dried at 60° C. for 1 hour in vacuum. This coating process was repeated once more. Three button cells were constructed in a flooded electrode configuration. The cells were interface with a potentiostat under galvanostatic control. The cells were cycled at C/10 at room temperature (typically 22-25° C.). The capacity retention is shown as trace 9C. Results were averaged across all cells.

Example 18

Fabrication of Li-Ion Electrochemical Cell

18a. The passivated lithium manganese oxide active material prepared in example 14a was mixed with Super P conductive carbon in a 90/10 weight ratio. 10 mg of the mixed powder was loaded into a ½" swagelock type cell as the WE with a nonwoven glass fiber separator (Whatman GF/D) soaked with an electrolyte consisting of a 1.2M $LiPF_6$ in ethylene carbonate/dimethylcarbonate/diethylcarbonate, 3/4/3 by volume, followed by Li metal as the CE. The cell was charged at a rate of C/10 to 4.3V. The potential was held at 4.3V until the current decayed to $1/100^{th}$ of its initial value. The cell is now said to be fully charge. The cell temperature was raised to 60° C. After a 3 hour equilibration, the cell was cycled at a rate of C/5 with potential cuttoff's of 3.0V and 4.3V for 50 cycles. For comparison two other cells were constructed using bare lithium manganese oxide (control cell) and 15 wt % coated lithium manganese oxide material that was only coated one time.

|  | % change in capacity from 0-50th Cycle |
|---|---|
| Bare lithium manganese oxide | 74 |
| 15 wt % coated - two stage coating | 12 |
| 15 wt % coated - single coating | 97 |

18b. The passivated composite electrodes prepared in example 15b were used to construct CR2032 electrochemical cells against Li metal as the CE. One porous polypropylene separator, Celegard 2400, and a tertiary electrolyte of 1.2M $LiPF_6$ in ethylene carbonate/dimethylcarbonate/diethylcarbonate, 3/4/3 by volume were used in a flooded electrode configuration. The cell was charged at a rate of C/10 to 4.3V. The potential was held at 4.3V until the current decayed to $1/100^{th}$ of its initial value. The cell is now said to be fully charged. The cell temperature was raised to 60° C. After a 3 hour equilibration, the cell was cycled at a rate of C/5 with potential cuttoff's of 3.0V and 4.3V for 50 cycles.

18c. Passivated composite electrodes fabricated in example 15e were used to create CR2032 electrochemical cells against Li metal as the CE with one porous polypropylene separator, Celegard 2400, and a tertiary electrolyte of 1.2M $LiPF_6$ in ethylene carbonate/dimethylcarbonate/diethylcarbonate, 3/4/3 by volume. The cell was charged at a rate of C/10 to 4.3V. The potential was held at 4.3V until the current decayed to $1/100^{th}$ of its initial value. The cell is now said to be fully charge. The cell temperature was raised to 60° C. After a 3 hour equilibration, the cell was cycled at a rate of C/5 with potential cuttoff's of 3.0V and 4.3V for 50 cycles.

| Cell Type | Specific Discharge Capacity (mah/g) | | |
|---|---|---|---|
|  | Cycle 1 | Cycle 10 | Cycle 23 |
| Bare lithium manganese oxide | 82 | 60 | 30 |
| Passivated lithium manganese oxide | 93 | 78 | 38 |

The above written description of the invention provides a manner and process of making and using it such that any person skilled in this art is enabled to make and use the same, this enablement being provided in particular for the subject matter of the appended claims, which make up a part of the original description.

As used herein, the words "a" and "an" and the like carry the meaning of "one or more." The phrases "selected from the group consisting of," "chosen from," and the like include mixtures of the specified materials. Terms such as "contain(s)" and the like are open terms meaning 'including at least' unless otherwise specifically noted.

All references, patents, applications, tests, standards, documents, publications, brochures, texts, articles, etc. mentioned herein are incorporated herein by reference. Where a numerical limit or range is stated, the endpoints are included. Also, all values and subranges within a numerical limit or range are specifically included as if explicitly written out.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. In this regard, certain embodiments within the invention may not show every benefit of the invention, considered broadly.

SUMMARY

This inventor has recognized many challenges related to advanced energy storage device architectures (Li-ion >4.5V, Lithium Sulfur, Calcium Sulfur, Calcium ion ect.); corrosion of a calcium metal electrode, the rapid self-discharge of a lithium sulfur cell or the decomposition of organic electrolytes on high voltage Li-ion battery cathodes. Categorizing these challenges as "interfacial or heterogeneous" in nature, this inventor identified an opportunity to explore the concept of using "passive or non-participating" films to mitigate said challenges.

The primary attributes of a robust, passive film include, but are not limited to adhesion, flexibility, mechanical tolerance and chemical inertness, alternatively stated—resistant to degradation of a primary, secondary or tertiary nature. Borosilicate glass is well known to be chemically inert and mechanically robust. The precursor to borosilicate glass, or the preceramic borosiloxane, was chosen as the starting point to build the material platform. Typical borosiloxane synthesis is performed in aqueous based solvents, not suitable for applications sensitive to water contamination, nor suitable to facile integration in hierarchical devices.

Figure 10:
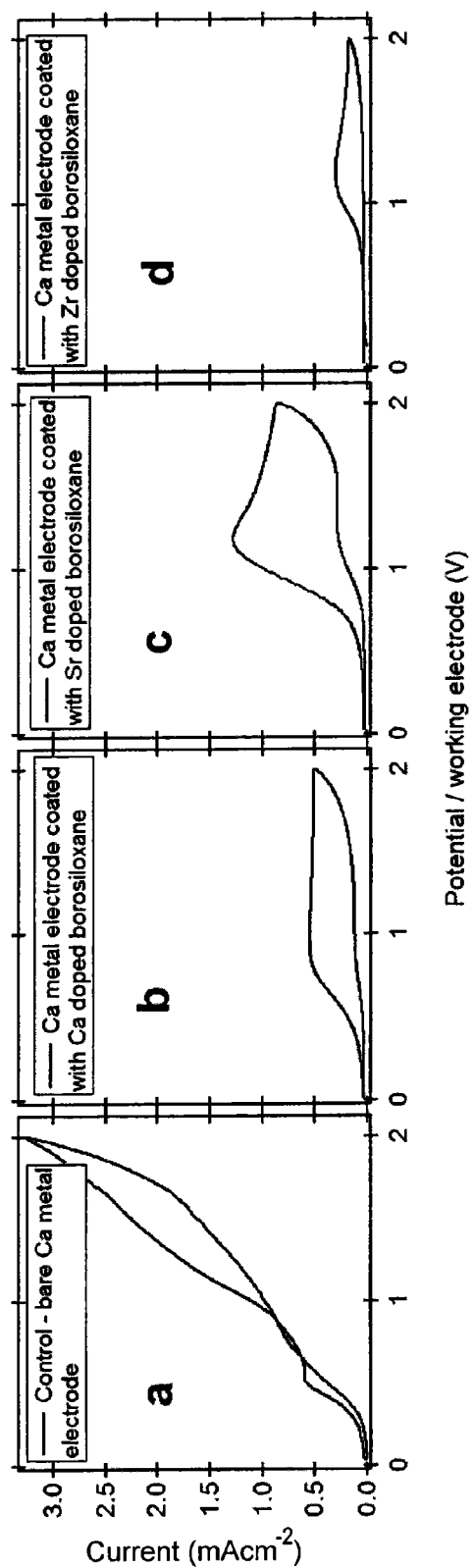
FIG. 10 demonstrates reversible $Ca^{2+}$ deposition (Ca plating) on a metallic Ca electrode by comparing the third cycle of the voltammetric wave of 3-electrode symmetric cell consisting of a calcium working electrode, a calcium counter electrode and a calcium reference electrode suspended in a 0.5M solution of calcium perchlorate in anhydrous acetonitrile with a scan rate of 1 $mVs^{-1}$ where the comparative traces are; (a.) control consisting of bare calcium metal working electrode, (b) calcium metal working electrode coating by calcium doped borosiloxane prepared in example 9a, (c) calcium metal working electrode coating by strontium doped borosiloxane prepared in example 9b, (d) calcium metal working electrode coating by zirconium doped borosiloxane prepared in example 7.
Figure 11:
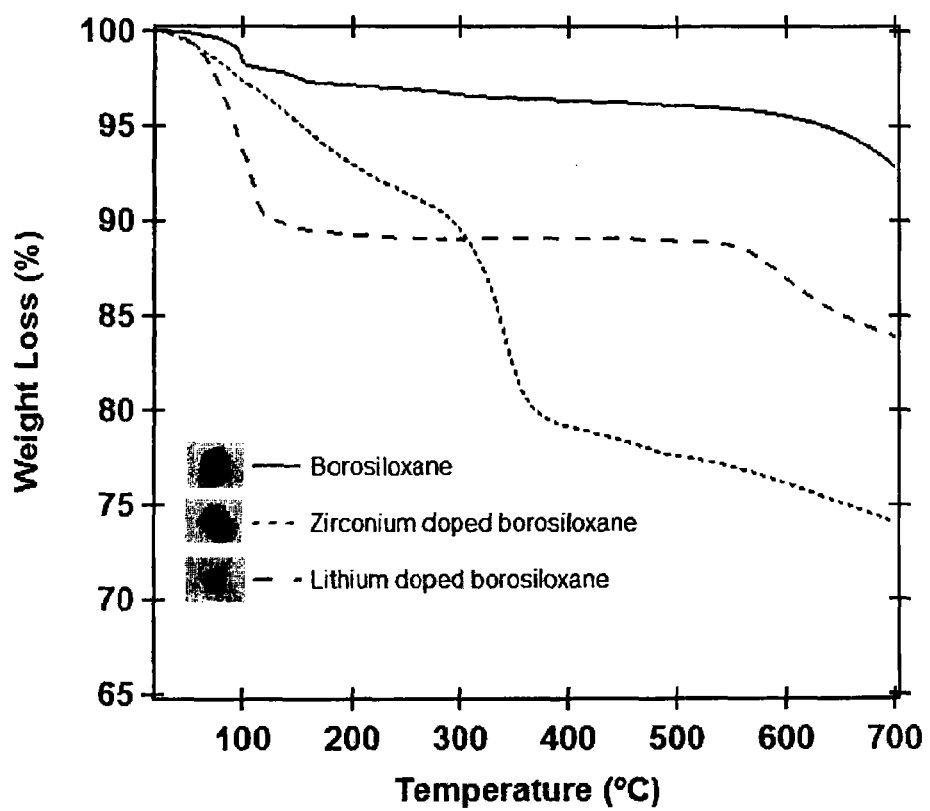
FIG. 11 represents a thermal gravimetric analysis in a nitrogen atmosphere of borosiloxane prepared in example 5, lithium doped borosiloxane prepared in example 6 and zirconium doped borosiloxane prepared in example example 7. The photographic insets reveal the degree of char residue after samples were heated to 700° C.

A detailed survey revealed an emerging synthetic technique using a lewis acid to carry out a catalyzed hydrosilylation with a silicon alkoxide (detailed discussion in para 0014-0017). Surprisingly, the prior art neither captures the boron family, nor other transition metal or metalloid binary/ternary variations. It was greatly unexpected how fast and clean the synthesis occurs. The improvements over state-of-the-art provided are:

Synthetic time scale reduced from days to minutes
Biproducts autogenously separated as low boiling gases like methane, ethane and propane
No external heat source is needed, synthesis conducted at room temperature
=B—O—Si≡ bridging is catalytically driven in a non-aqueous media
As-prepared resin is immediately applied to devices, no purification needed These attributes are industrially advantageous considering facile process integration. For instance, this inventor was pleasantly surprised to learn the as prepared resin can be applied to most any surface (without adhesion promoters); heat treated to drive off the delivery solvent and condense the film and retain conformal adhesive properties. Remarkable bulk adhesion and wetting was confirmed on glass, aluminum, polyethylene terephthalate, polyimide, steel, graphitic surfaces, alumina, pristine lithium and calcium surfaces. It's not obvious to those even highly skilled in the art to realize borosiloxane applicability to unstable, reactive surfaces like calcium and lithium simply because said resins contain water that will poison the metallic interface. Yet, FIG. 10 clearly demonstrates, for the first time to this inventor's knowledge, the reversible deposition of calcium ions on metallic calcium.

To those even moderately skilled in the art, it would seem counterintuitive to apply an insulating film (ionic and electronic) like borosiloxane on an electrode where logically it would sever the electrochemical circuit rendering the cell useless. On the contrary, it was most surprising and unexpected to observe a functional electrochemical circuit where the borosiloxane interface serves to improve the electrochemical stability of the system.

REFERENCES

1. Jones R G, Ando W, Chojnowski J, *Silicon-Containing Polymers: The Science and Technology of Their Synthesis and Applications*, Kluwer, The Netherlands, 2000
2. (a) Piers WE; *ADVANCES IN ORGANOMETALLIC CHEMISTRY*, VOL 52, 1-76, 2005, (b) Erker G; *DALTON TRANSACTIONS*, 11, 1883-1890, 2005
3. Parks D J, Piers W E; *JOURNAL OF THE AMERICAN CHEMICAL SOCIETY*, 118 (39), 9440-9441, 1996
4. Rubinsztajn S, Cella J A; *MACROMOLECULES*, 38 (4), 1061-1063, 2005
5. Thompson D B, Brook M A; *JOURNAL OF THE AMERICAN CHEMICAL SOCIETY*, 130 (1), 32, 2008
6. Chojnowski J, Rubinsztajn S, Fortuniak W, et al; *MACROMOLECULES*, 41 (20), 7352-7358, 2008
7. (a) US2006/0211836, (b) U.S. Pat. No. 7,148,370B1
8. (a) DISLICH H; *ANGEWANDTE CHEMIE-INTERNATIONAL EDITION*, 10 (6), 363, 1971, (b) MUKHERJEE S P; *JOURNAL OF NON-CRYSTALLINE SOLIDS*, 42 (1-3), 477-488, 1980
9. (a) IRWIN A D, HOLMGREN J S, ZERDA T W, et al; *JOURNAL OF NON-CRYSTALLINE SOLIDS*, 89 (1-2), 191-205, 1987, (b) Soraru G D, Dallabona N, Gervais C, et al; *CHEMISTRY OF MATERIALS*, 11 (4), 910-919, 1999, (c) Kasgoz A, Misono T, Abe Y; *JOURNAL OF NON-CRYSTALLINE SOLIDS*, 243 (2-3), 168-174, 1999
10. MEHROTRA R C; *STRUCTURE AND BONDING*, 77, 1-36, 1992
11. (a) WO 2009/111193 A1, (b) WO 2009/129175 A1

The invention claimed is:

1. A siloxy resin made by a process comprising reacting (i) a hydridosilane or a hydridosiloxane and (ii) a compound comprising at least one selected from the group consisting of an alkaline earth metal alkoxide, a transition metal alkoxide, or a metalloid alkoxide, in the presence of a Lewis acid.

2. The siloxy resin of claim 1, wherein the compound comprises an alkaline earth metal alkoxide.

3. The siloxy resin of claim 1, wherein the compound comprises a transition metal alkoxide.

4. The siloxy resin of claim 1, wherein the compound comprises a metalloid alkoxide.

5. The siloxy resin of claim 1, wherein the siloxy resin produced is cross-linked.

6. The siloxy resin of claim 5, wherein the siloxy resin produced is ternary cross-linked or cross-linked in a network.

7. The siloxy resin of claim 4, wherein the metalloid alkoxide is alkoxyborane.

8. The siloxy resin of claim 7, wherein a stoichiometric Si:B ratio of the siloxy resin produced is between 500:1 and 1:100.

9. The siloxy resin of claim 4, wherein the metalloid alkoxide is at least one selected from the group consisting of

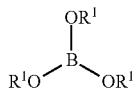
(I)

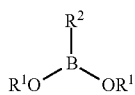
(II)

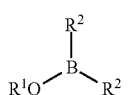
(III)

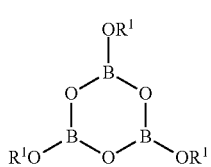
(IV)

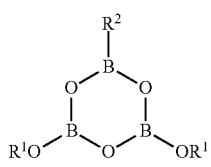
(V) and

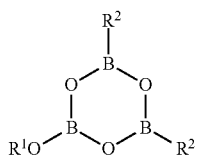
(VI)

where $R^1$ is alkyl or aryl;

$R^2$ is alkyl, aryl, $C_1$-$C_{20}$ aliphatic radical, cycloaliphatic radical, aromatic radical, allylic radical, arylaliphatic radical or substituted aliphatic, cycloaliphatic or arylaliphatic radical in which substituted groups are selected from the group consisting of heteroatoms, methyl, ethyl, isopropyl, allyl, methallyl, benzyl, morpholyl, and methylthioethyl.

10. The siloxy resin of claim 9, wherein $R^1$ is methyl, ethyl, propyl, isopropyl, butyl, sec-butyl, or tert-butyl.

11. The siloxy resin of claim 1, wherein the hydridosilane or hydridosiloxane is represented by at least one of the following structures (VII)-(XVIII):

(VII)

(VIII)

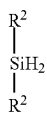
(IX)

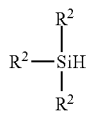
(X)

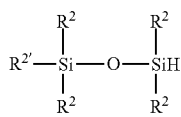
(XI)

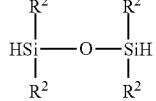
(XII)

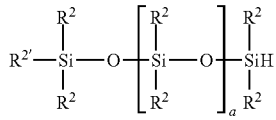
(XIII)

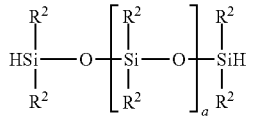
(XIV)

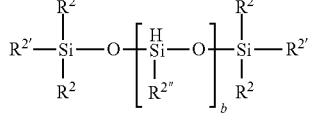
(XV)

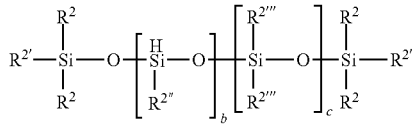
(XVI)

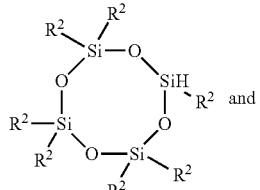
(XVII) and

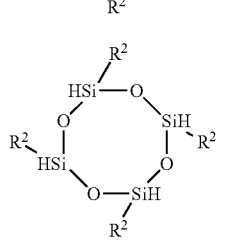
(XVIII)

where $R^2$, $R^{2'}$ and $R^{2'''}$ are each independently linear or branched alkyl, aryl, $C_1$-$C_{20}$ aliphatic radical, cycloaliphatic radical, aromatic radical, allylic radical, arylaliphatic radical or substituted aliphatic, cycloaliphatic or arylaliphatic radical in which substituted groups are selected from the group consisting of heteroatoms, methyl, ethyl, isopropyl, allyl, methallyl, benzyl, morpholyl, and methylthioethyl, a is an integer from 1 to 8, b is an integer from 1 to 10,000, and c is an integer from 0 to 15,000, wherein the sum of b+c is in the range of 2 to 20,000 inclusive.

12. A method for producing the siloxy resin of claim 1 comprising reacting (i) a hydridosilane or a hydridosiloxane and (ii) a compound comprising at least one selected from the group consisting of an alkaline earth metal alkoxide, a transition metal alkoxide, or a metalloid alkoxide in the presence of a Lewis acid, to obtain the siloxy resin.

13. The method of claim 12, wherein the compound comprises an alkaline earth metal alkoxide.

14. The method of claim 12, wherein the compound comprises a transition metal alkoxide.

15. The method of claim 12, wherein the compound comprises a metalloid alkoxide.

16. The siloxy resin of claim 1, wherein the reaction is conducted at room temperature.

17. The siloxy resin of claim 1, wherein no product purification steps are required, and said products are directly applied to fabrication processes.

18. A method of applying the siloxy resin of claim 1 to a negative electrode comprising an electrochemical cell.

19. A method comprising applying the siloxy resin of claim 1 to a positive electrode of an electrochemical cell.

20. A barrier film comprising the siloxy resin of claim 1.

21. An energy storage device, comprising a Li doped borosiloxane, wherein the borosiloxane comprises a siloxy resin made by a process comprising reacting (i) a hydridosilane or a hydridosiloxane and (ii) a compound comprising a metalloid alkoxide, in the presence of a Lewis acid.

22. A conformal passivant or thin film coating on a photoluminescent down-converted phosphor for a light emitting diode, the conformal passivant or thin film comprising a siloxy resin made by a process comprising reacting (i) a hydridosilane or a hydridosiloxane and (ii) a compound comprising at least one selected from the group consisting of an alkaline earth metal, a transition metal or a metalloid alkoxide, in the presence of a Lewis acid.

* * * * *